(12) United States Patent
Seela et al.

(10) Patent No.: US 11,579,983 B2
(45) Date of Patent: Feb. 14, 2023

(54) SNAPSHOT PERFORMANCE OPTIMIZATIONS

(71) Applicant: EMC IP Holding Company LLC, Hopkinton, MA (US)

(72) Inventors: Nagapraveen Veeravenkata Seela, Cary, NC (US); Alan L. Taylor, Cary, NC (US); Nagasimha G. Haravu, Apex, NC (US); Michael C. Brundage, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 40 days.

(21) Appl. No.: 17/152,169

(22) Filed: Jan. 19, 2021

(65) Prior Publication Data
US 2022/0229734 A1    Jul. 21, 2022

(51) Int. Cl.
*G06F 16/00* (2019.01)
*G06F 11/14* (2006.01)
*G06F 16/11* (2019.01)
*G06F 16/182* (2019.01)

(52) U.S. Cl.
CPC ...... *G06F 11/1461* (2013.01); *G06F 11/1451* (2013.01); *G06F 11/1464* (2013.01); *G06F 16/128* (2019.01); *G06F 16/1844* (2019.01)

(58) Field of Classification Search
None
See application file for complete search history.

(56) References Cited

U.S. PATENT DOCUMENTS

| 10,552,071 | B1 | 2/2020 | Haravu et al. | |
|---|---|---|---|---|
| 2015/0143065 | A1* | 5/2015 | Lu | G06F 11/14 711/162 |
| 2018/0314454 | A1* | 11/2018 | Kandamuthan | G06F 3/0673 |

FOREIGN PATENT DOCUMENTS

CN    111316245 A  *  6/2020  ......... G06F 16/2246

* cited by examiner

*Primary Examiner* — Bai D Vu
(74) *Attorney, Agent, or Firm* — Muirhead and Saturnelli, LLC

(57) ABSTRACT

Techniques for creating and using snapshots may include: receiving a request to create a new snapshot of a source object; determining whether a first generation identifier associated with the source object matches a second generation identifier associated with a base snapshot of the source object; determining whether the source object has been modified since the base snapshot was created; and responsive to determining the first generation identifier matches the second generation identifier and also determining that the source object has not been modified since the base snapshot was created, associating the new snapshot with the base snapshot thereby indicating that the new snapshot and the base snapshot have matching content and denote a same point in time copy of the source object.

19 Claims, 16 Drawing Sheets

SNAPSHOT PERFORMANCE OPTIMIZATIONS

BACKGROUND

Technical Field

This application generally relates to data storage.

Description of Related Art

A data storage system may include different resources used by one or more host processors. The resources and the host processors in the system may be interconnected by one or more communication connections, such as network connections. These resources may include data storage devices such as those included in the data storage system. The data storage system may be coupled to one or more host processors and provide storage services to each host processor. Multiple data storage systems from one or more different vendors may be connected and may provide common data storage for the one or more host processors.

A host may perform a variety of tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium of creating and using snapshots comprising: receiving a request to create a new snapshot of a source object; determining whether a first generation identifier associated with the source object matches a second generation identifier associated with a base snapshot of the source object; determining whether the source object has been modified since the base snapshot was created; and responsive to determining the first generation identifier matches the second generation identifier and also determining that the source object has not been modified since the base snapshot was created, associating the new snapshot with the base snapshot thereby indicating that the new snapshot and the base snapshot have matching content and denote a same point in time copy of the source object. The source object may be a storage object representing any one of a logical device, a file, a file system, a directory and a virtual volume used by one or more virtual machines.

In at least one embodiment, the request to create the new snapshot may be issued from a control path. The request may be issued by a scheduler component in accordance with a defined periodic time interval at which snapshots of the source object are taken. The defined periodic time interval may be included in a local protection policy specified for the source object. The defined periodic time interval may be a recovery point objective of a remote protection policy specified for the source object. The remote protection policy may specify an asynchronous remote replication configuration for the source object, and wherein the asynchronous remote replication configuration may include the source object of a source data storage system configured with a target object as a remote counterpart for the source object. A remote replication facility may automatically replicate modifications of the source object to the target object. The remote replication facility may use a snapshot difference technique that performs processing including: taking two successive snapshots of the source object; and determining the data difference with respect to the two successive snapshots, wherein the data difference denotes data blocks of the source object that have been modified in the time interval between the two successive snapshots, wherein the data blocks that have been modified are replicated from the source system to the target system and applied to the target object. Determining the data difference with respect to the two successive snapshots may include: determining whether a third generation identifier associated with a first snapshot of the two successive snapshots matches a fourth generation identifier associated with a second snapshot of the two successive snapshots; and responsive to determining the third generation identifier matches the fourth generation identifier, determining that the two successive snapshots have matching content, and otherwise determining that the two successive snapshots do not have matching content. The first snapshot and the second snapshot may be associated with a same replica of the source object, wherein the replica may denote a particular point in time copy of the source object. The first snapshot and the second snapshot may be associated with a same set of one or more data structures representing the same replica denoting the particular point in time copy of the source object.

In at least one embodiment, the first snapshot may be associated with a first replica of the source object and the second snapshot may be associated with a different second replica of the source object. The first replica and the second replica may each represent a same particular point in time copy of the source object, wherein the first replica may be associated with the third generation identifier and wherein the second replica may be associated with the fourth generation identifier. The first snapshot may be associated with a first set of one or more data structures representing the same particular point in time copy of the source object and the second snapshot may be associated with a second different set of one or more data structures also representing the same particular point in time copy of the source object.

In at least one embodiment, processing may include responsive to determining that the first generation identifier does not match the second generation identifier or determining that the source object has been modified since the base snapshot was created, performing first processing to create a new replica denoting a new snapshot instance of the source object on the data path and associated the new replica with the new snapshot. Processing may include determining whether the base snapshot is specified in the request; and responsive to determining the base snapshot is not specified in the request, performing the first processing to create a new replica denoting a new snapshot instance of the source object on the data path and associated the new replica with the new snapshot.

BRIEF DESCRIPTION OF THE DRAWINGS

Features and advantages of the present invention will become more apparent from the following detailed description of exemplary embodiments thereof taken in conjunction with the accompanying drawings in which:

FIGS. 1 and 3 are examples of components that may be included in systems in accordance with the techniques described herein.

DETAILED DESCRIPTION OF EMBODIMENT(S)

Figure 1:
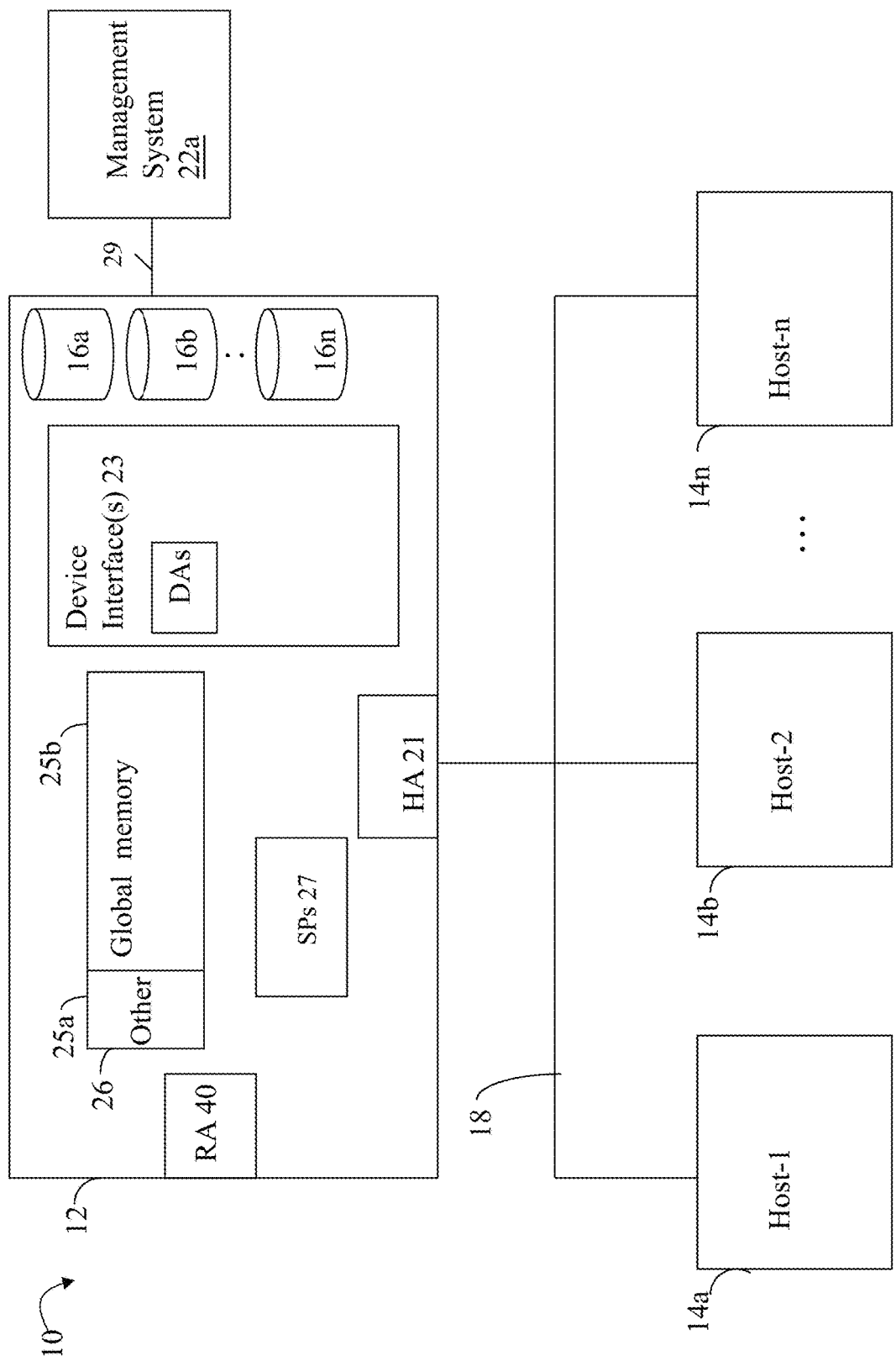

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDs 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different adapters, such as each HA, DA, RA, and the like, may be implemented as a hardware component including, for example, one or more processors, one or more forms of memory, and the like. Code may be stored in one or more of the memories of the component for performing processing. In other embodiments where the different adapters are not implemented as separate hardware components, the different adapters may denote logical processing performed generally by one or more CPUs or cores allocated to perform such logical processing of the different adapters.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on user data stored on the data storage system. For example, in at least one embodiment in accordance with the techniques herein, a data storage system may provide different data replication technologies, facilities or services. Such replication technologies may be characterized as local or remote. Additionally, a replication technology may provide for creating a complete, physical bit for bit copy of data (that is local and/or remote). A replication technology may provide for creating a logical or virtual point in time copy of a data source such as using a snapshot technology or facility known in the art. Such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage object or entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like. In at least one embodiment, the snapshot facility may be characterized as a local replication facility or service that takes snapshots of storage objects in a single data storage system. A local replication facility may be contrasted with a remote replication facility that provides for remote replication of storage objects from a source site or data storage system to a remote site or data storage system. Remote replication facilities provide remote copies of the storage objects for use in connection with data unavailability or disaster of the source site.

Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

An embodiment in accordance with the techniques herein may also provide a replication service or facility, such as a remote replication facility, that provides for automatically replicating a storage object or entity of a first or source data storage system on a second or remote data storage system. Consistent with other discussion herein, the storage object of a replication service or facility, both local and remote, may be, for example, a logical device or LUN, a file, file system, and the like. A remote replication facility may automatically mirror or replicate all writes performed to the source storage object on the first system to a duplicate target storage object on the remote second data storage system. In connection with source and target storage objects that are logical devices, the source and target logical devices may be configured to have the same size or capacity as well as have other matching characteristics in order to have the target logical device be a mirror of the source logical device. In this manner, the target logical device on the second or target data storage system may be used in the event of data unavailability or a disaster at the first data storage system. Generally, each logical device of the source system may be similarly configured for replication on the target system.

In at least one embodiment, the remote replication facility may use a technique referred to as a snapshot difference or snap diff technique. The snap diff technique provides for taking two successive snapshots of the logical device or other storage object on the source system that is replicated on the target system, and then determining the data difference with respect to the two successive snapshots. The data difference denotes the data blocks that have been modified in the time interval from a first point in time to a second later point in time, where a first snapshot is taken at the first point in time and a second successive snapshot is taken at the second point in time. The time interval may correspond, for example, to a recovery point objective (RPO) defined as the maximum amount of allowable data loss, as measured by time, that can be lost after a recovery from a disaster, failure, or comparable event before data loss will exceed what is acceptable to an organization. The snap diff technique may provide for taking a snapshot at each RPO interval. For example, for an RPO of 5 hours, a snapshot of the logical device may be taken on the source system every 5 hours and compared to the immediately prior snapshot to determine the data differences including data blocks that have been modified since the immediately prior snapshot. The data differences including the modified data blocks of the logical device are then transferred from the source system to the target system and applied to the remote copy of the logical device on the target or remote system.

In at least one embodiment, the remote replication facility may provide one or more supported replication modes such as asynchronous remote replication and synchronous remote replication. With remote replication, the source system may receive a write to a source storage object configured to have a corresponding target storage object on the remote or target system. The write data may be stored on the source system in a cache and then later destaged or written out from the cache to a physical location on the backend PDs of the source system provisioned for the source storage object. With asynchronous remote replication, an acknowledgement regarding completion of the write I/O operation may be returned to the host or other client that originated the write I/O operation once the write data of the write I/O operation is stored in the cache of the source system. With synchronous remote replication, an acknowledgement is not returned to the host or other client that originated the write I/O operation until the target system has acknowledged completion of the replicated write I/O operation on the target system. The write data may also be transferred to the remote target system for replication on the target storage object. Responsive to receiving the write data transferred from the source system to the remote target system, the write data may be stored in a cache of the target system. At a later point in time, the write data is destaged or written out from the cache of the target system to a physical location on the backend PDs of the target system provisioned for the target storage object. The target system may send an acknowledgement regarding successful completion of the write I/O operation on the target system once the data written by the write operation has been stored in the cache of the target system. With synchronous replication, the host or other client originating the write I/O operation may be sent an acknowledgement regarding completion of the write I/O operation responsive to the source system receiving the foregoing acknowledgement regarding successful completion of the replicated write I/O operation from the target system. Asynchronous replication mode may be preferred for longer distances between the source and target systems to minimize time outs occurring on an external host waiting to receive the acknowledgement from the source system regarding completion of the write I/O operation.

Figure 1A:
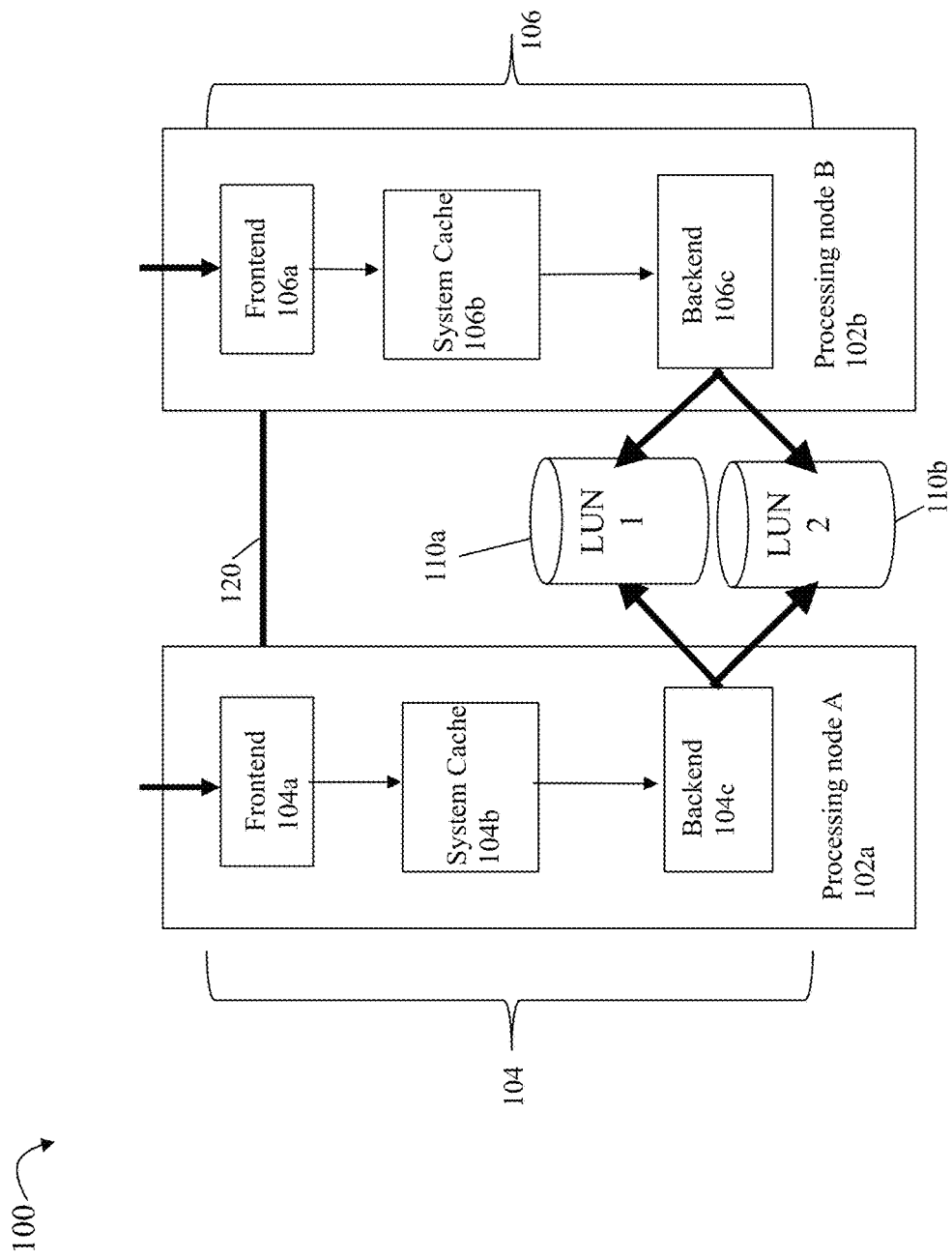
FIGS. 1A and 2A are examples illustrating the I/O path or data path in connection with processing data in embodiments in accordance with the techniques herein.

With reference to the FIG. 1A, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; and a backend (BE) component 104c that facilitates movement of the data between the system cache and non-volatile physical storage (e.g., back end physical non-volatile storage devices or PDs accessed by BE components such as DAs as described herein).

In a manner similar to that as described for data path 104, the data path 106 for processing node B 102b has its own FE component 106a, system cache layer 106b, and BE component 106c that are respectively similar to the components 104a, 104b and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with a read operation to read a block of data, a determination is made as to whether the requested read data block is stored in the system cache 104b. If the requested read data block is in the system cache, the read data block is retrieved from the system cache 104b and returned to the host. Otherwise, if the requested read data block is not in the system cache 104b but is stored on the physical storage 110a, 110b, the requested data block is read by the BE component 104c from the backend storage 110a, 110b, stored in the system cache and then returned to the host.

In some embodiment, other data operations such as data reduction operations known in the art may be performed with respect to user data stored on the backend storage 110a, 110b. For example, such data reduction operations may include data compression and/or data deduplication. If the requested read data block is not stored in its original form on the backend storage 110a, 110b but is rather stored in a modified form, such as a deduplicated or compressed form, the original form of the read data block is recreated and stored in the system cache in its original form so that it can be returned to the host. Thus, requested read data stored on physical storage 110a, 110b may be stored in a modified form where processing may additionally be performed to restore or convert the modified form of the data to its original data form prior to returning the requested read data to the host.

Also illustrated in FIG. 1A is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the BE PDs. For example, in at least one embodiment, a RAM based memory may be one of the caching layers used as to cache the write data that is then flushed to the BE PDs. When the processor performs processing on data, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 1A. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 1A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by the one or more processors of each node. Each node of the pair may include its own resources such as its own processors, memory, cache and the like.

Figure 1B:
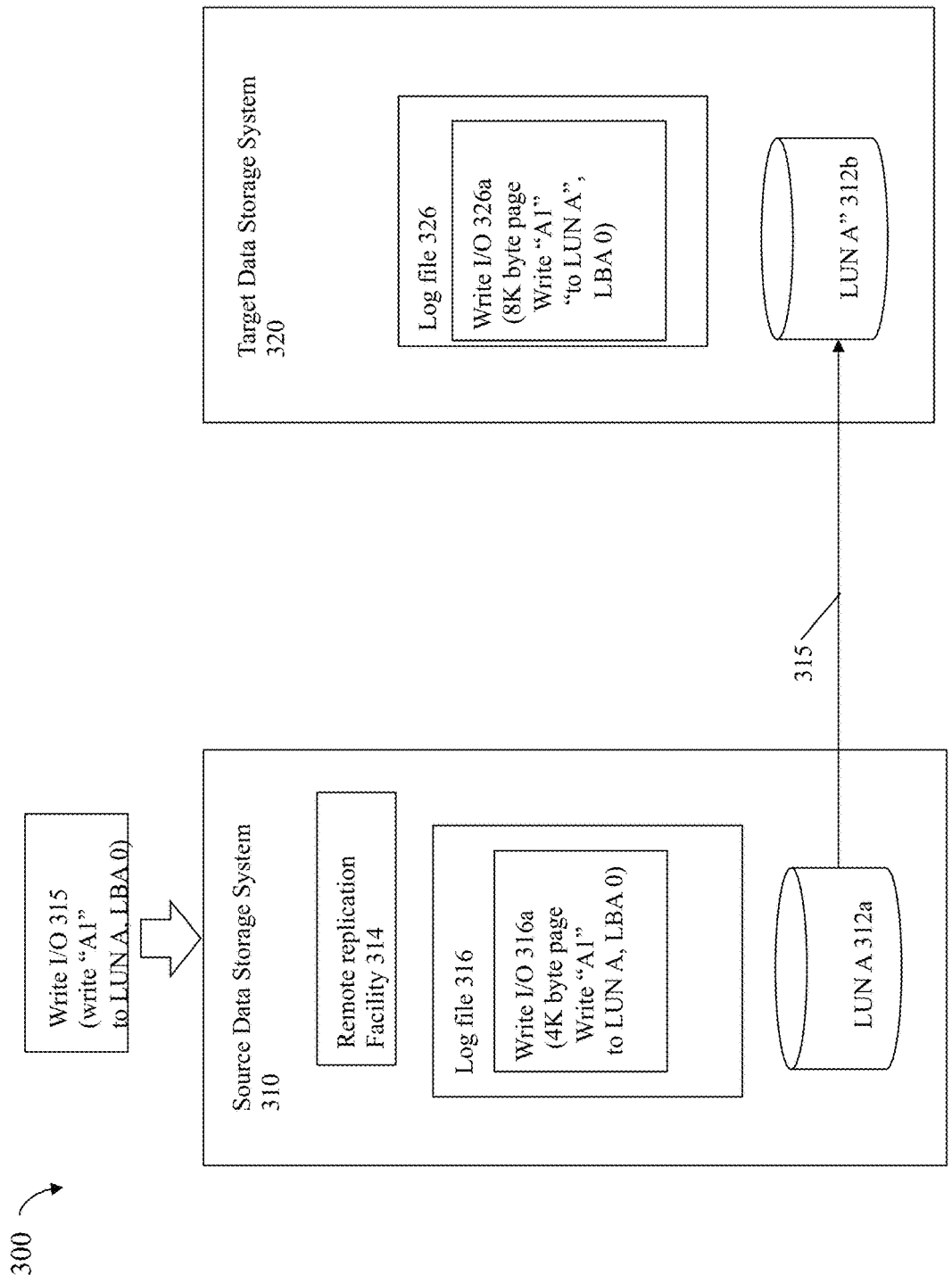
FIG. 1B is an example illustrating remote data replication in an embodiment in accordance with the techniques herein.

Referring to FIG. 1B, shown is an example 300 illustrating remote replication in at least one embodiment of a data storage system in accordance with the techniques herein.

The example 300 includes a source data storage system 310 and a target data storage system 320. The source data storage system 310 includes a remote replication facility 314, a log file 316 and a LUN A 312a. The target data storage system 320 includes a log file 326 and a LUN A" 312b. Generally, the systems 310, 320 may include other elements of data storage system such as described elsewhere herein but which are omitted for simplicity of illustration.

The LUN A 312a may denote a logical device of the source system 310 that is configured for remote replication on the target system 320 as the LUN A" 312b. The replication of the LUN A 312a as the LUN A" 312b may be performed by a remote replication facility 314. In at least one embodiment, the remote replication facility 314 of the source system 310 may use the snap diff technique as described elsewhere herein in connection with determining the data blocks of the LUN A 312a that have been modified. The modified user data blocks are then transferred 315 from the source system 310 to the target system 320 and written to the LUN A" 312b. In this example, assume that the LUN A 312a and the LUN A"312b are configured as corresponding logical devices for asynchronous remote replication by the remote replication facility 314.

For simplicity of illustration, processing is described with respect to remote replication of a single logical device, LUN A 312a, of the source system. More generally, many source logical devices of the source system 310 may be configured to have corresponding remote counterpart target logical devices on the target system 320, where the replication facility provides for remotely replicating data of the source logical devices in an ongoing continuous manner to the remote target logical devices.

The source data storage system 310 may receive a write I/O operation 315 from a host. The write I/O operation 315 may write the content "A1" to the offset or LBA 0 of LUN A 312a. The write I/O operation 315 may be recorded as the record 316a in the log file 316 of the source system 310 where the content or data written by the logged write I/O operation is subsequently destaged at a later point in time to non-volatile storage of the BE PDs of the source system 310 provisioned for LUN A 312a. An acknowledgement regarding completion of the write I/O operation may be sent to the host after the write I/O 315 is recorded in the record 316a of the persistently stored log file 316. Independently, the remote replication facility 314 may determine, using the snap diff technique, that the LBA 0 of the LUN A on the source system 310 has been updated and needs to be replicated to the target system 320. Accordingly, the remote replication facility 314 may perform processing to replicate the write data "A1" written to LUN A, LBA 0 to the target system for replication on the corresponding counterpart LUN A" 312b. For example, the remote replication facility may send information to the target system including the write data "A1" and also including the target location on LBA 0 of the LUN A" 312b where the write data or updated content is to be written. In response to receiving the write data and the target location, the target system 320 may log a write operation 326a in its log file 326. The log record 326a of the write operation may indicate to store the write data ("A1") at the target location LUN A", LBA 0. Once the write I/O operation is recorded in the record 326a in the log file 326, the target system 320 may provide an acknowledgement to the source system 310 regarding successful completion of the write I/O operation to replicate the write data on the target system. At a later point in time subsequent to recording the write I/O operation in the log file 326, the recorded write I/O 326a of the log file 326 may be flushed where the write data of the record 326a is written out to physical storage on the BE PDs of the target system for the LUN A" 312b.

The typical I/O pattern for each of the log files 316, 326 as a result of recording write I/Os and possibly other information in successive consecutive log file records includes logically sequential and logically contiguous writes (e.g., logically with respect to the logical offset or ordering within the log file). Data may also be read from the log file as needed (e.g., depending on the particular use or application of the log file) so typical I/O patterns may also include reads. The log file data may have a physical storage layout corresponding to the sequential and contiguous order in which the data is written to the log file. Thus, the log file data may be written to sequential and consecutive physical storage locations in a manner corresponding to the logical sequential and contiguous order of the data in the log file.

The log file may be flushed sequentially to maintain desired data consistency. In order to maintain data consistency when flushing the log file, constraints may be placed on an order in which the records of the log file are flushed or logically applied to the stored data while still allowing any desired optimizations. Such constraints may consider any possible data dependencies between logged writes and other logged operations in order to ensure write order consistency.

In at least one embodiment, creating a new snapshot of a source storage object, such as a LUN, may be initiated by issuing a control path command which is then passed to the data path for implementation to actually create a new snapshot instance or replica of the source on the data path.

Consistent with other discussion herein, snapshots of objects, such as a LUN, may be periodically created and deleted as part of policy based data protection activities. For example, snapshots may form the basis for local data protection, asynchronous remote replication, backup operations to the cloud or other target, and the like. The creation and deletion of these snapshots can add considerable load on the system. There may be instances where a storage object, such as a LUN, may not have undergone a change with respect to user data stored on the LUN since the last time a snapshot of the LUN was taken.

In accordance with the techniques described in the following paragraphs, it may be desirable to detect such a condition of when a storage object for which a new snapshot is requested has not undergone data changes since the last prior snapshot was taken. Responsive to detecting this condition, the techniques herein as described in the following paragraphs may optionally prevent the creation of the new snapshot instance or new replica on the data path and rather associate the new snapshot of the control path and the prior snapshot of the control path with the same physical instance or replica denoting a snapshot of the data path. The snapshot of the data path may denote a point in time copy of the storage object and may include the data structure(s) necessary to represent the data of the point in time copy of the storage object. By associating the new snapshot of the control path and also the immediately prior snapshot of the control path with the same replica or snapshot on the data path, the techniques herein provide for associating both the new snapshot of the control path and the prior snapshot of the control path with the same point in time copy of the storage object as representing using the data path snapshot.

Additionally, in some systems, determining the data differences between two snapshots may also be a frequently performed operation and may thus add considerable load on the system. For example, as discussed elsewhere herein, a remote replication facility of a data storage system may use the snap diff technique in connection with asynchronous remote replication. In such an embodiment, the data difference between two consecutive snapshots of a remotely replicated storage object is determined, where the data difference includes the changed user data blocks to be replicated to the remote target system. In connection with remote replication and possibly other tasks or services, described in the following paragraphs are techniques that provide for efficiently tracking changes to the storage object and detecting the condition of when there have been no data changes between the two consecutive snapshots. In connection with remote replication, use of the techniques herein provides for detecting when there have been no data changes between the two consecutive snapshots in an efficient manner using stored attributes or flags associated with the snapshots.

Thus, in at least one embodiment, the techniques described in the following paragraphs provide for improved snapshot creation performance as well as improved as improved asynchronous remote replication performance. Additionally, in such an embodiment, the techniques herein provide for improved overall data storage system performance by reducing the number of data path snapshots or replicas. Having a reduced number of data path snapshots or replicas results in a reduction in overhead costs to maintain and utilize the data path snapshots in connection with other data services or tasks.

The foregoing and other aspects of the techniques herein are described in more detail in following paragraphs.

In at least one embodiment in accordance with the techniques herein, data protection policies may be configured by a user for storage objects such as LUNs, files, file systems, logical device groups (i.e., logically defined groups each including one or more LUNs or logical devices), one or more directories, virtual volumes (VVOLS) used by virtual machines such as on external hosts, and the like.

In at least one embodiment, for each storage object, a local protection policy (LPP) and a remote protection policy (RPP) may be specified by a user. Each LPP and RPP may include rules defining the particular policy. For example, a LPP for a LUN may include rules of a snapshot schedule for the LUN. The rules of the LPP may include a snapshot time interval indicating that a snapshot is to be created of the LUN at each occurrence of the time interval, such as every 15 minutes, every 6 hours, and the like. The rules of the LPP may also specify, for example, how long a snapshot is retained, such as, for example, 1 week. After a particular snapshot of the LUN has been retained the specified retention time period such as 1 week, the snapshot of the LUN may be destroyed. An RPP for the LUN may similarly include rules defining the remote protection policy configured for the LUN. For example, consider a source LUN of the source system configured for remote data replication on a target LUN of a target system. The RPP for the source LUN may include an RPO indicating a time interval, such as every 15 minutes, where the source LUN and target LUN are synchronized every 15 minutes. Thus, at each occurrence of the time interval denoted by the RPO, the source system may determine the data changes (e.g., updates or writes) made to the source LUN since the last or most recent RPO synchronization, and then transfer such data changes of the source LUN from the source system to the target system, where the target system then applies the data changes to the configured remote target LUN.

The following paragraphs may describe use of the techniques herein with respect to a LUN or logical device for purposes of illustration. More generally, the techniques described herein may be used in connection with any supported storage object, some of which are mentioned elsewhere herein.

In at least one embodiment, asynchronous remote replication may be implemented using a snapshot-based solution also referred to herein as a snap diff or snapshot difference technique as discussed elsewhere herein. In such an embodiment, a user may configure the RPP for the source LUN which results in performing processing that establishes and initiates remote replication services for the source LUN. The processing includes establishing an asynchronous remote replication session for the source LUN between the source and target data storage systems. Additionally, the processing includes taking an initial snapshot of the source LUN and synchronizing the content of the source LUN, as reflected by the initial snapshot, on the target LUN of the target system. This initial snapshot denotes the base snapshot of the LUN at a first point in time. At a later second point in time such as denoted by an occurrence of the next RPO synchronization point, a second snapshot of the source LUN may be taken. The data difference between the base snapshot and the second snapshot may be determined where the data difference denotes any blocks of the source LUN that have changed since the most recent previous snapshot, the base snapshot, was taken. The changed data blocks of the data difference are replicated from the source system to the target system as part of the next synchronization of the source LUN and the target LUN. Subsequently, the foregoing may be repeated in an ongoing manner at each synchronization point by 1) determining the data difference or changed data blocks between a new snapshot of the source LUN at a current synchronization point and the last or most recent previous snapshot of the source LUN associated with the immediately prior synchronization point; and 2) replicating the changed data blocks from the source system to the target system where the target system then writes the changed data blocks to the target LUN. Consistent with other discussion herein with asynchronous remote replication, writes or modification to the source LUN may be made where the writes to the source LUN are replicated to the target LUN on the target system in an ongoing continuous manner. With asynchronous remote replication, an acknowledgement regarding completion of a write to the source LUN from a host may be returned to the host once the write has been stored in the cache of the source system.

In at least one embodiment, a scheduler may determine when there is a need to perform different control path operations on the storage objects in accordance with the various data protection policies associated with the storage objects, and then may accordingly initiate performing such operations. For example, based on the LPP for the LUN, the scheduler determines when a new snapshot of the LUN is to be created, when to delete or destroy an existing snapshot of the LUN based on the snapshot retention time period, and the like. Based on the RPP for the LUN, the scheduler determines when the next RPO synchronization point occurs thereby triggering processing to determine the changed data blocks to be replicated to the target LUN on the target system. As described elsewhere herein, the data difference for the LUN may be determined using the snap diff technique where the data difference denotes the data blocks of the LUN that have changed since the last or most recent prior synchronization point.

Thus, snapshots of LUNs, logical device groups, file systems, and virtual volumes, and other storage objects may be periodically created and deleted as part of policy based data protection activities on a data storage system. In some data storage systems as described herein, snapshots may thus form the basis for local data protection, remote data protection such as asynchronous replication, and backup purposes. Generally, the creation and deletion of snapshots that may be performed in connection with LPPs and RPPs can add considerable load to the data storage systems. Many times, a storage object, such as a LUN, may not have undergone any data change since the last time a snapshot was taken. Detecting this condition when there have been no data changes and optionally omitting the snapshot creation/deletion cycle when there have been no data changes since the last snapshot may reduce the load on the data storage system. Likewise, enumerating differences between two snapshots may also be a frequently performed operation (e.g., such as described herein when performing asynchronous remote replication) that can add considerable load on the system.

The techniques described in the following paragraphs may be used to optimize processing performed in connection with snapshot operations. The techniques provide for efficiently determining when there have been no data changes since the last or most recent snapshot has been taken of a storage object. The techniques may include optionally omitting creating a new replica or snapshot instance of the storage object in the data path when there have been no data changes since the last or most recent snapshot of the storage object. The techniques herein provide a mechanism by which the changes to the storage object may be tracked in a minimally disruptive manner to optimize handling of snapshot creation and differential operations when no data changes are detected for the storage object.

In at least one embodiment, during the creation of snapshot on a LUN or other storage object, if a base snapshot is specified, then a new snapshot is created only if the storage object's data is different from the base snapshot. The techniques herein provide storage object attributes and snapshot attributes used to determine if the storage object has any data changes from the point-in-time the base snapshot was taken. The techniques herein provide for maintaining and using these attributes in an efficient manner to minimize the CPU time consumed during I/O processing and thus reduce any adverse performance impact in connection with snapshot operations.

Before further describing processing performed in accordance with the technique herein in connection with a control path request to create a new snapshot, what will now be described is an example of a modified data path and components in at least one embodiment in accordance with the techniques herein.

Figure 2A:
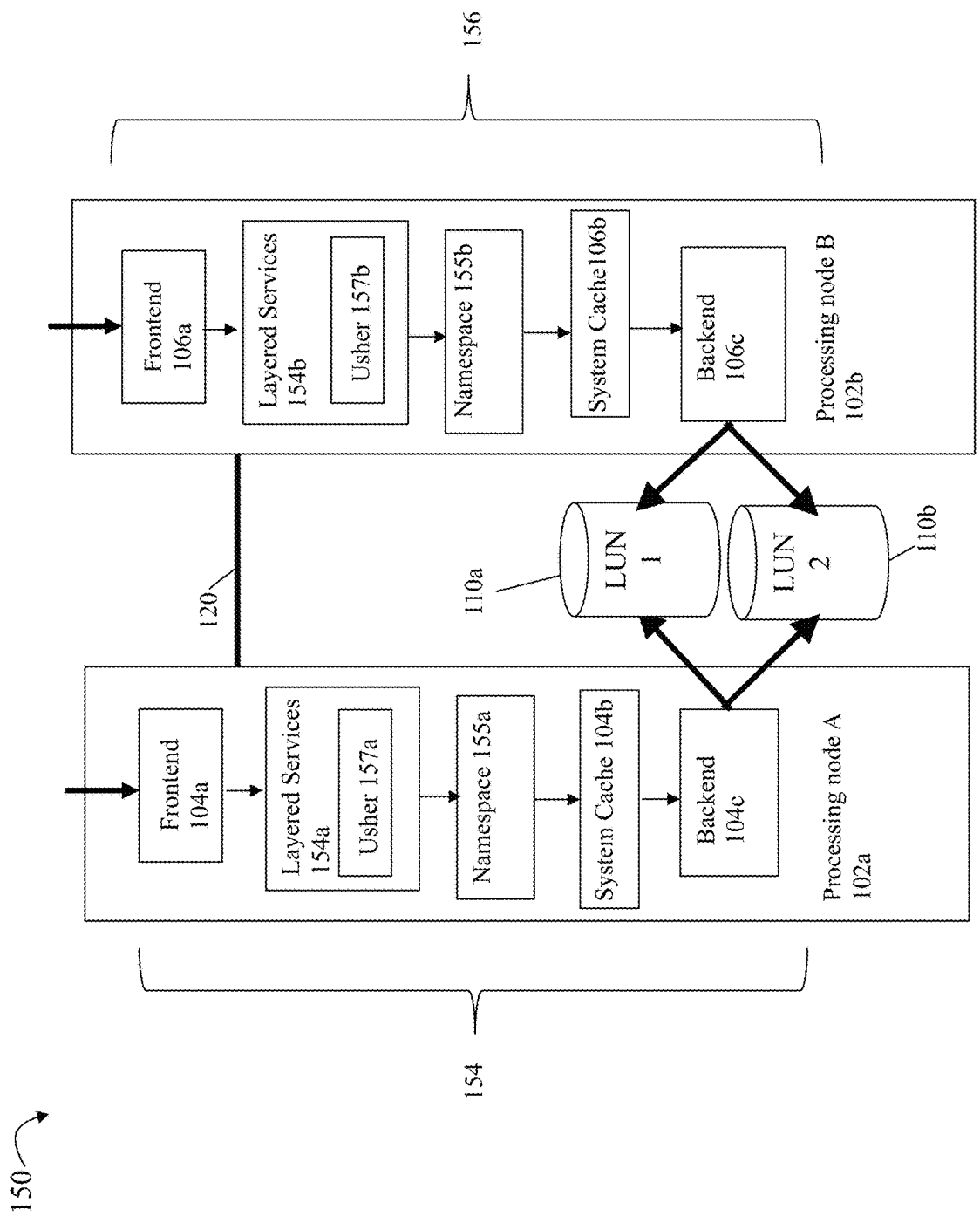

With reference to FIG. 2A, shown is an example illustrating components that may be included in the runtime call stack of the data paths in an embodiment in accordance with techniques herein. The example 150 includes components similar to those as illustrated in FIG. 1A with the difference that the layered services 154a, 154b and the namespace components 155a, 155b have been added, respectively, to each of the call stacks or data paths 154, 156. The elements 154 and 156 are respectively similar to the elements 104 and 106 of FIG. 1A with the respective addition of the layered services 154a, 154b and the namespace components 155a, 155b. As illustrated, the layered services 154a is introduced into call stack 154 between the FE component 104a and the namespace component 155a; and the layered services 154b is introduced into the call stack 156 between the FE component 106a and the namespace component 155b. In the example 150, the layered services 154a, 154b appear as fixed components. However, within the layered services 154a and 154b, components may be dynamically added or removed from the runtime stacks 154, 156. Thus, within the layered services 154a and 154b, the particular components which are actually enabled, invoked and dynamically included in a runtime instance (e.g., call chain) of the call stack varies with the particular services or tasks performed on the storage object.

In at least one embodiment, the layered services 154a and 154b each include a bootstrap fixed component (e.g., referred to as the layer services orchestrator component in the following description and examples) which decides whether additional components are to be injected or dynamically included in the runtime call chain or stack of components. Additionally, the layered services 154a, 154b respectively include at least one component referred to as the usher component 157a, 157b described further elsewhere herein. Each received I/O operation may thus be passed down the stack 154, 156 from the front end 104a, 106a to the usher component 157a, 157b. From here, the usher component 157a, 157b may then further forward the I/O operation as may be appropriate to one or more other components of the layered services 154, 156 for processing. Thus, in an embodiment in accordance with techniques herein, the data path and thus the runtime stack for a storage object may vary with the particular storage object and services to be performed on the storage object. The particular components of the layered services framework 154a, 154b that are enabled and dynamically included in the call stack are customized and may vary with the storage object and services or operations performed for that storage object.

The namespace components 155a, 155b are included in the data path and provide file-like semantics on a LUN storing user data. For example, the namespace components 155a, 155b may provide an interface for use by other layers above 155a, 155b in the runtime stacks 154, 156 to create a LUN, delete a LUN, read data from a LUN, write data to a LUN, set or get attributes of a LUN, and the like. In such an embodiment generally, a storage object such as a LUN of user data may be implemented as a file in a file system. In this manner, a relative file offset in the file corresponds to a logical address or offset in the logical address space of the LUN that is mapped onto the file system address space. In at least one embodiment in accordance with the techniques herein, the file system in which the LUNs and other storage objects are implemented as files may be a UNIX-style file system. In such a file system, an index node (inode) is a data structure used to represent a filesystem object, such as a directory or file (i.e., where such files may correspond to storage objects such as LUNs including user data). In connection with the LUN storing user data implemented as the file in the file system, an inode for the file stores metadata (MD) about the file such as various file attributes and other information. An embodiment may implement storage objects such as LUNs generally in any suitable manner and is not limited to the particular implementation and details described herein.

Figure 2B:
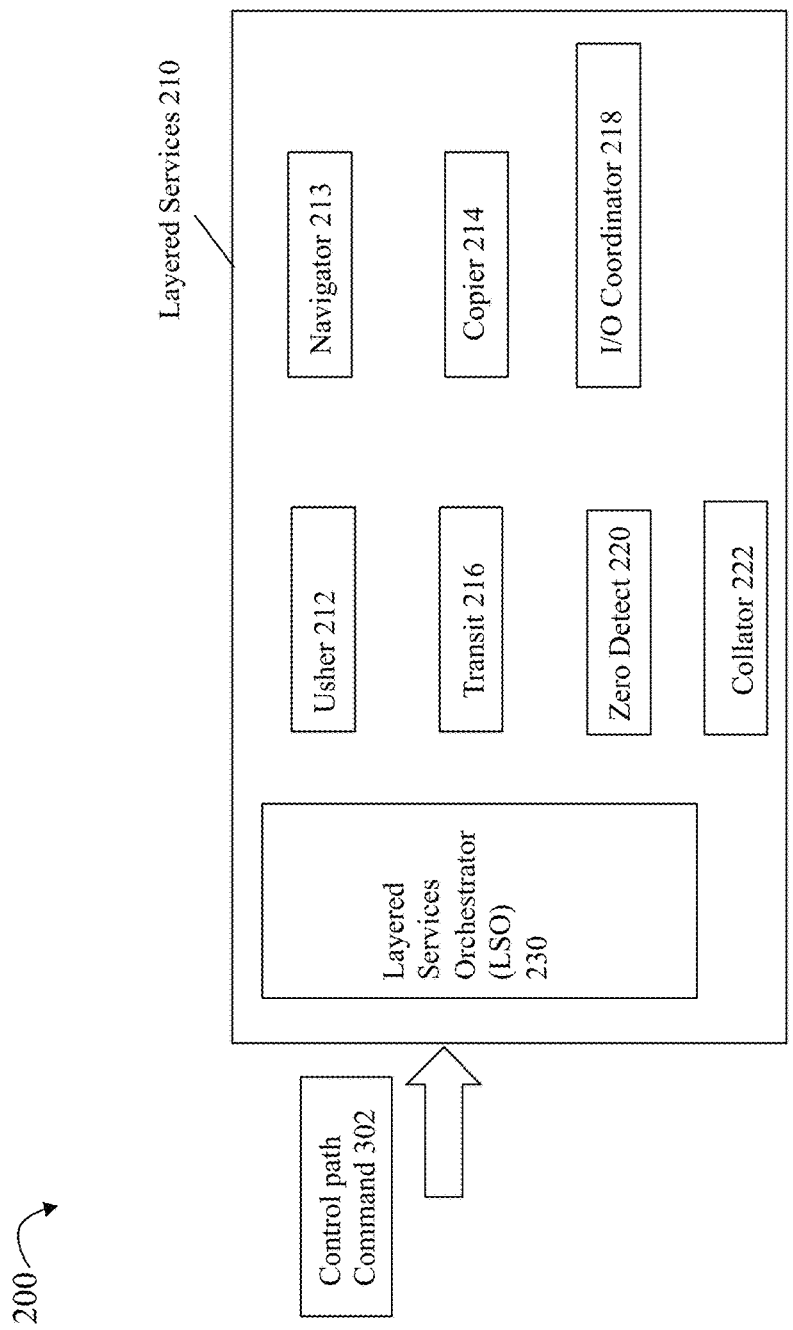
FIG. 2B is an example of components that may be included in a layered services framework in an embodiment in accordance with the techniques herein.

Referring to FIG. 2B, shown is an example 200 of components of the layered services framework 210 in an embodiment in accordance with techniques herein. The layered services framework 210 may include the following modules or components: a layered services orchestrator (LSO) component 230, an usher component 212, a navigator component 213, a transit component 216, a copier component 214, a zero detect component 220, and an I/O coordinator component 218.

The LSO 230 may be characterized in one aspect as an administrative component that, as described elsewhere herein, determines what additional components, if any, of the layered services framework 210 are included in the data path and runtime stack associated with a particular storage object. The usher 210 is the component at the top of each layered services stack for any/all storage objects. In at least one embodiment, the usher 210 is mandatory and required for each data path call stack and offers a fixed target component for receiving I/O requests from the FE component (e.g., 104a, 106a as in FIG. 2A). The remaining six (6) components 213, 214, 216, 218, 220 and 222 may be optionally included in the data path, and thus call stack, of a particular storage object depending on the particular data services enabled for the storage object. In the simplest or basic case, the data path call stack for a storage object, such as a LUN, may include only the usher component 212 in the layered services portion. Thus, for example, with reference back to FIG. 2A, the layered services 154a of the LUN's data path runtime stack 154 and the layered services 154b of the LUN's data path runtime stack 156 would include only the usher 212 (e.g., the data path runtime stacks 154a and 154b respectively only include the usher component 157a, 157b in the layered services 154a, 154b). At a later point in time, the data path run time stack for the LUN may be modified, for example, to include one or more additional ones of the components 213, 214, 216, 218, 220, 222 where the particular components and their placement or order in the stack varies with the particular one or more services enabled with respect to the particular LUN.

As noted above, the LSO 230 may be characterized in one aspect as an administrative component and may receive control path commands affecting the associated call stack of a storage object. For example, the LSO may receive a control path command to enable, disable, or otherwise modify an existing data service for a LUN. As another example, the LSO may receive a control path command to enable asynchronous remote replication for LUN 1, to enable or create snapshots for LUN 2, and the like. In response, the LSO may perform processing to determine the appropriate one or more other components needed for the newly added/enabled service and accordingly modify the existing call stack.

In one aspect, the 6 components 213, 214, 216, 218, 220 and 222 may be characterized as building blocks or basic atomic components that may be selectively included and arranged in a particular calling sequence in the runtime call stack in accordance with the particular service(s) enabled for a LUN. An embodiment may generally include other components used as building blocks than those as illustrated in the example 200 of FIG. 2B. Thus, generally, the usher 212 is the single component of the layered services required in the runtime call stack and zero or more instances of the 6 components (e.g., 213, 214, 216, 218, 220 and 222) may be optionally additionally included in the runtime call stack as needed depending on services enabled for the LUN. Thus, the particular components of the layered services framework 210 and well as their particular runtime call sequence or chain(s) vary with, and depend on, the particular service(s) enabled for each storage object.

The LSO 230 adds or removes components (from the layered services 210) of the data path stack in a non-disruptive manner. The LSO 230 provides another orchestration layer and exposes high level data path primitives to the control path. Such high level data path primitives may be issued by the control path to the data path, where the high level data path primitives issued by the control path may include a request to the data path to create a new snapshot (e.g., such as the control path issuing the CreateSnap request to the data path as described elsewhere in connection with FIGS. 3A-B and FIGS. 5A-B), enabling remote replication, and the like. The usher 212 is at the beginning or top of the layered services stack (e.g., denoted as 154a and 154b in FIG. 2A). The processing performed by LSO 230 includes determining any needed updates or modifications to the data path call stack and then implementing the updated or modified data path call stack for use with the LUN or other storage object in a non-disruptive manner. For example, the LSO 230 may receive the control path command to enable the asynchronous remote replication for the LUN. In response to receiving the control path command, the LSO 230 may communicate with the usher component to temporarily hold or pause any newly received I/Os (e.g., client or host I/Os received by the usher 212 for processing) directed to the LUN, such as by placing the I/Os in a queue or buffer. Additionally, any pending or in-progress I/Os may be completed or drained. Any copying performed by configured components of the layered services portion of the data path call stack may be suspended. (Such copying may be performed, for example, by the copier component 214). The LSO 230 may then determine the modified data path call stack, insert the necessary components into the data path call stack, and then restart or resume processing I/Os whereby the I/Os in the queue or buffer (and any subsequently received I/Os directed to the LUN) are processed. Additionally, any copying performed by a layered services component, such as the copier component 214, may be resumed.

It should be noted that the LSO 230 may use any suitable mechanism for performing processing as described herein. For example, at least one embodiment of the LSO 230 may use a rules engine to determine the particular components of the layered services framework 210, calling sequence or chain, parameters, and the like, to use for each data service triggering a modification to the data path call stack. The LSO 230 is the common interface used to dynamically and selectively determine the data path call stack for multiple different storage objects of any type.

Generally, the copier component 214 copies data between two LUNs. The transit component 216 may be characterized as a protocol abstraction layer for one or more supported protocols such as, for example, iSCSI, TCP, NVMe-oF (Non Volatile Memory Express over Fibre Channel), and the like. The transit component 216 may be used to communicate with other storage systems and products. The navigator component 213 mirrors I/O requests to one or more destinations or targets each of which may be local or remote. The I/O coordinator 218 manages host and copy collisions. The collator 222 combines multiple smaller write I/Os into a single larger write I/O.

The zero detect component 220 detects if a block of zeroes is written to an unallocated region. In such a case where a write is performed to write a block of zeroes, the zero detect component prevents allocating storage unnecessarily. In one aspect, the zero detect component 220 may be viewed as performing an optimization whereby, rather than allocate storage and write out the block of zeroes, the component 220 may perform alternative processing that simply tracks that the logical address space of the write to the unallocated region has all zeroes stored therein.

In the following paragraphs and figures, reference may be made to the layered services framework (LSF) indicating generally a transfer of control to the appropriate one or more components of the LSF 210 included in the data path and runtime call stack.

Figure 2C:
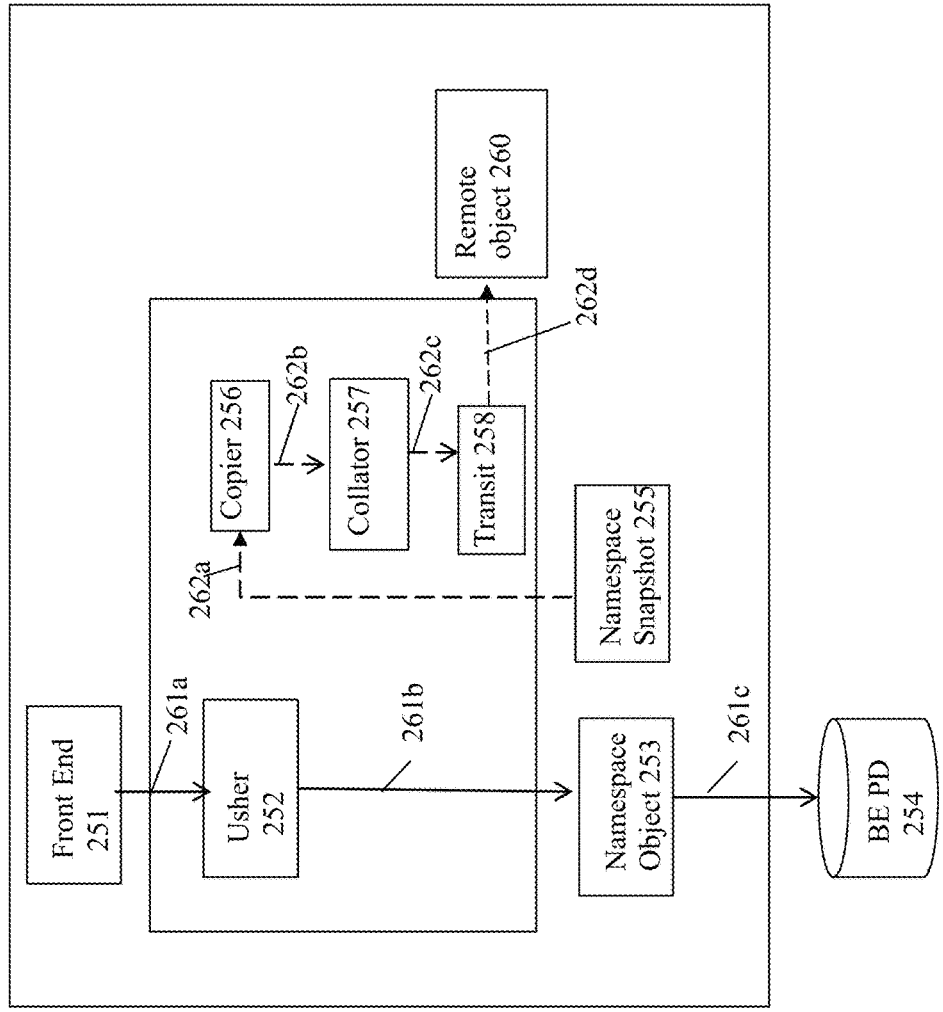
FIG. 2C is an example of components that may be included in a data path for remote replication in an embodiment in accordance with the techniques herein.

Referring to FIG. 2C, shown is an example 250 illustrating selected components of the layered services configured for the data service of asynchronous replication using a data push model between the source or local storage object, the namespace object 253, and a remote storage object 260. The data path runtime stack may be configured by the LSO to add the components 256, 257 and 258 responsive to a control path command to enable asynchronous replication for the object 253. For example, the object 253 may be a source LUN on a source data storage system configured for remote asynchronous replication to a remote copy of the source LUN, denoted as the object 260, on a target data storage system. With asynchronous replication, the remote storage object 260 denotes a point in time physical copy of the local namespace storage object 253. However, due to the asynchronous aspect, the local object 253 and the remote object 260 are not exact mirrors of one another and do not denote the same point in time copies. Thus, the local storage object 253 represents the current point in time copy of the LUN, and the remote object 260 represents a copy of the LUN from a previous point in time.

The example 250 includes the front end component 251, the usher component 252, the local namespace storage object 253, the BE PD 254, the namespace snapshot 255 (denoting the source of the changed data blocks to be replicated), the copier component 256, the collator component 257, the transit component 258, and the remote object 260. The namespace snapshot 255 may denote the current snapshot taken of the namespace storage object 253 where the namespace snapshot 255 may be treated, with respect to techniques herein, as representing another storage object. When asynchronous replication is configured between the local storage object 253 and the remote object 260 on the remote target system, the snap diff technique as described herein may be performed where the most recent snapshot is denoted by the namespace snapshot 255 that contains the changed data blocks to be replicated.

As illustrated in the example 250, layered services are leveraged to insert the copier 256, the collator 257 and the transit 258 components in the data path and thus the runtime stack. In this example 250, the elements 261-c denote the host I/O data flow as a result of host I/Os issued to the LUN denoted by the namespace object 253 having corresponding physical storage provisioned on the BE PD 254. The host I/O, such as write I/O, is received by the front end component 251 and forwarded to the usher component 252 and written to the LUN, the namespace object 253.

The elements 262a-d denote the copy I/O data flow in connection with transferring the replicated data from the source system to a remote target system including the remote object 260. With the copy I/O data flow, the copier component 256 reads data from the namespace snapshot 255 which is then provided to the collator component 257 that collates multiple smaller writes into a single larger write. The larger write is then provided from the collator component 257 to the transit component 258. The transit component 258 may then transmit the write data being replicated to the remote system including the remote object 260

With asynchronous replication as described elsewhere herein in more detail, a host write to the local storage object 253 is acknowledged once the write data has been stored in the cache of the local system. Subsequently, the write data is transmitted to the remote system and applied to the remote object 260.

In at least one embodiment, the data path processing may treat each data source of a snapshot, such as a LUN, file, file system, or VVOL, as a storage object, and may additionally treat each snapshot of the data source as a storage object. These objects may be associated with attributes including persisted attributes and volatile attributes. The attributes may include a snapshot generation identifier (also sometimes referred to as a snap generation ID or snap gen ID) and an isclean attribute. In one embodiment, a snap gen ID may be associated with each object. For example, each LUN as well as each snapshot of a LUN, may have its own associated snap gen ID. The snap gen ID may be characterized as a globally unique ID assigned to an object. Two objects having the same user data or content have the same snap gen ID. If two objects have two different snap gen IDs, the content or data of the two objects is not identical. In some instances, two or more snapshots having identical content may have associated snapshot identifiers that point to the same replica or data path snapshot instance denoted by the one or more structures used to represent the content of the replica. In some instances the two or more snapshots may have associated snapshot identifiers that point to different replicas or data path snapshot instances all having the same snap gen ID.

The isclean attribute may be associated with a data source of a snapshot, such as a LUN or other storage object that is a base or data source with respect to which one or more snapshots are taken. For example, an isclean attribute may be associated with each LUN or other storage object (e.g., data source) of which a snapshot may be taken. In at least one embodiment, the isclean attribute may be implemented as an in-memory attribute or flag or Boolean across both nodes of the system. The isclean attribute associated with a source object is set to true immediately after a snapshot of the source object is taken, and is to false when the first data modification or change is received on the source object after the snapshot is taken. In at least one embodiment, when the system is booted, the isclean attribute may be set to false for a LUN or other object (that is a source of a snapshot) across both nodes. Subsequently, the isclean attribute may be set to true after the next snapshot of the LUN is taken. Any subsequent write to the LUN on either node checks the state of isclean locally on that node. When processing the write to the LUN as part of the data path, if the state of isclean is true, then isclean is set to false. Otherwise, processing of the write to the LUN proceeds with the normal flow. Thus, the management of the isclean attribute minimally impacts write performance.

Thus, the isclean attribute indicates whether the associated storage object is clean (e.g., not modified) or dirty (e.g., has been modified) since the last or most recent snapshot of the storage object was obtained. In this manner, the isclean attribute associated with a storage object is set to true each time a new snapshot of the storage object is taken. When there is a write to the storage object, the isclean attribute is set to false. When the time arrives to take the next snapshot of the storage object such as based on the LPP for the storage object, the isclean attribute may be examined. If the isclean attribute associated with the storage object is true, then the storage object is clean and has not been modified since the last or most recent prior snapshot of the storage object was taken. Otherwise, if the isclean attribute associated with the storage object is false, then the storage object is dirty and has been modified since the last or most recent prior snapshot of the storage object was taken.

If the snap gen ID of an associated storage object matches the snap gen ID of a particular replica or data path snapshot of the object and there have been no modifications to the object since the particular snapshot was taken, then the content of the object is identical to the content of the particular replica or data path snapshot.

In at least one embodiment, both of the above-noted new attributes of the snap gen ID and isclean may be managed by the usher component described elsewhere herein, where the usher component may be further characterized as the runtime entry point of the data path stack.

Figure 3A:
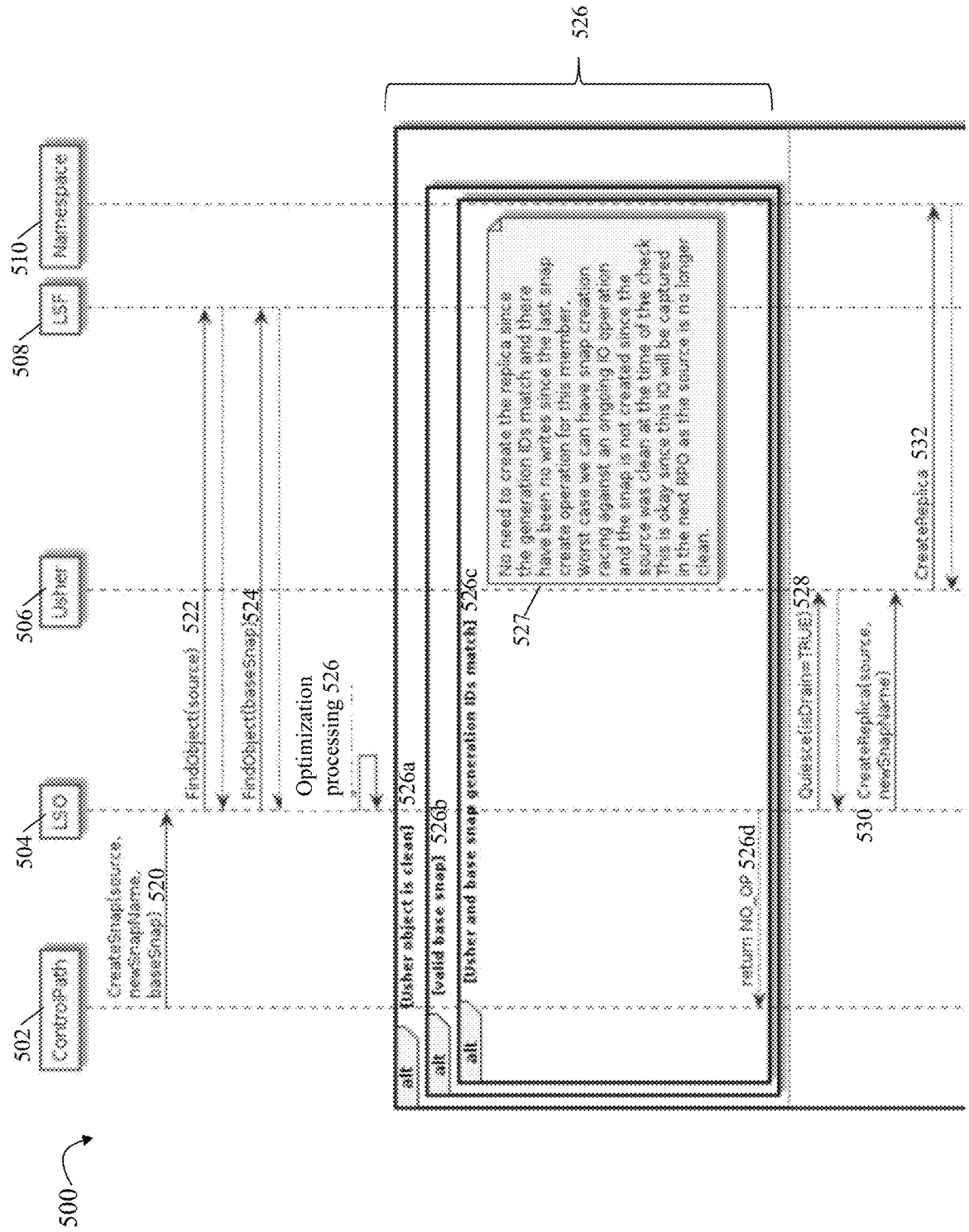
FIGS. 3A, 3B, 3C, 5A and 5B are sequence diagrams denoting processing that may be performed in an embodiment in accordance with the techniques herein.
Figure 3B:
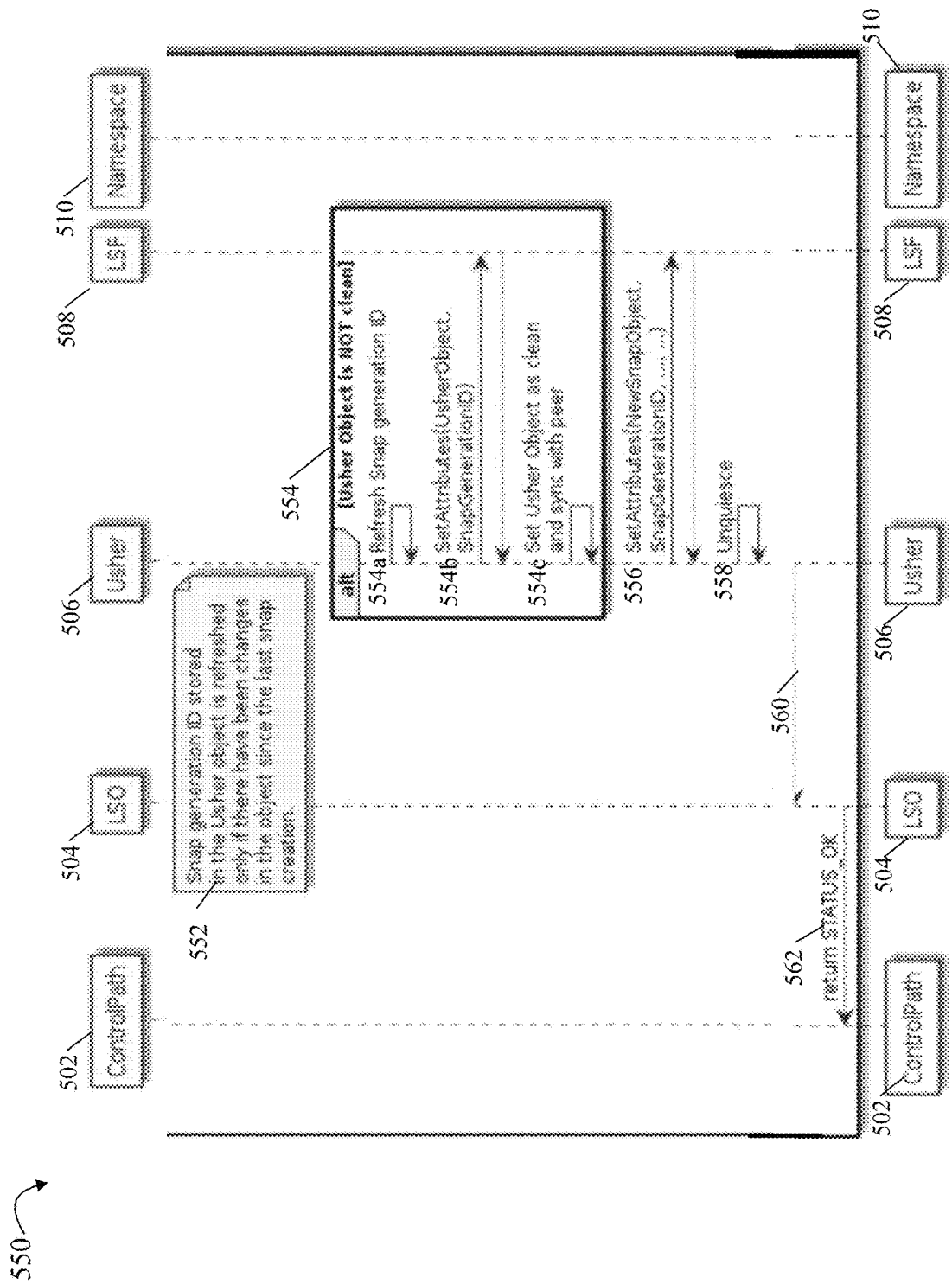

In at least one embodiment, when a snapshot create request, such as the CreateSnap request described below in connection with FIGS. 3A and 3B, is submitted to the data path, an optional base snapshot may be passed in. When the base snapshot is supplied, the caller is asking for the new snapshot to be created only if there are changes to the LUN since the base snapshot was taken. During the snapshot creation processing, the isclean attribute or flag is first checked. If the flag is false indicating the LUN is 'dirty', the normal snapshot creation flow is followed through. At the end of snapshot creation processing when a new data path snapshot or replica is created: 1. the isclean flag for the LUN is set to true on both nodes; 2. a new snap gen ID is generated and assigned to the LUN; and 3. the newly created data path replica or snapshot is also assigned the same new snap gen ID. The first user data change or modification to the LUN after the snapshot is created checks the isclean flag. Since the isclean flag is true, it needs to update the flag to false on both nodes of the appliance. This has an additional impact to the performance, but may be subjected to only the first write after the snapshot.

During the snapshot create request processing with a base snapshot supplied, if the isclean flag is found to be true, it is assured that there have been no data modifications or changes since the most recent snapshot of the LUN taken. However, processing is also performed as part of the request to determine whether that the base snapshot supplied refers to the most recent snapshot of the LUN. Therefore, the snap gen ID of the base snapshot is compared against the LUN's snap gen ID. If the foregoing two snap gen IDs match and the LUN's isclean flag is true, then the base snapshot provided as an input with the request indeed matches last snapshot taken, and there have been no changes to the source LUN since that last or most recent snapshot (specified by the base snapshot). Upon determining that there have been no changes to the source LUN since the last or most recent snapshot, no new data path snapshot or replica is created in accordance with the techniques herein. Otherwise, the snapshot request processing proceeds with the normal snapshot creation process to create a new replica or data path snapshot in response to the request.

Referring to FIGS. 3A and 3B, shown is a sequence diagram illustrating processing in connection with creating a snapshot for a single storage object as a source in at least one embodiment in accordance with the techniques herein. The processing of the FIGS. 3A and 3B denotes interactions and the process flow performed between the control path 502, the LSO 504, the usher component 506, the LSF 508, and the namespace component 510. The components denoted by the elements 502, 504, 506 508 and 510 are described elsewhere herein.

A command or request to create a new snapshot of a source storage object (also referred to as a source) may be received on the control path 502. The command or request may be initiated, for example, by a user requesting a new snapshot on demand such as using a GUI or CLI (command line interface) of a management application, or by a scheduler taking snapshots periodically at defined intervals such as based on a LPP or based on an RPO of a RPP. The control path 502 receives the initial request and issues a corresponding CreateSnap request 520 to the data path by sending the request 520 to the LSO 504. In this example, the CreateSnap request 520 includes the following input parameters:

source—denoting the source storage object of which the snapshot is to be taken;

newSnapName—denoting the name of the new snapshot to be created; and baseSnap—denoting the base snapshot.

Consistent with discussion elsewhere herein, the baseSnap parameter may be optional. If the baseSnap parameter is specified however, in at least one embodiment, processing may be performed to determine whether the optimization processing in accordance with the techniques herein may be performed to possibly omit creating a new replica or data path snapshot. In such an embodiment, specifying the baseSnap parameter may be interpreted as an implied request to perform this optimization, if possible. If the baseSnap is omitted from the input parameters, then by default the new replica or data path snapshot may be created without checking to see if specified criteria are met to omit creating the new replica or data path snapshot.

The CreateSnap request 520 to the data path is sent from the control path 502 to the LSO 504. In response, the LSO 504 requests 522 the source from the usher component 506, which in turn issues the request 522 to the LSF 508 that returns the source object to the LSO 504. The SP 504 also requests 524 the baseSnap 524 from the usher component 506, which in turn issues the request 524 to the LSF 508 that returns the baseSnap object to the LSO 504. The LSO 504 then performs the optimization processing 526 to determine whether specified criteria are met and if so, then omits creating a new replica or data path snapshot in response to the request 520. The criteria includes determining that the isclean attribute or flag associated with the source is true 526a, determining that the baseSnap parameter denotes a valid base snapshot 526b and determining that the snap gen IDs of the source and the baseSnap match. If the foregoing 3 conditions of the criteria are met, then control proceeds to 526d to return to the control path 502 without creating a new replica or data path snapshot. The return statues of No_op or no operation returned by 526d denotes that no new replica or data path snapshot was created and rather the optimization processing was successfully completed. In this case as described in more detail below, the existing replica or data path snapshot currently associated with the most recent control path snapshot of the source may also be associated with a new control path snapshot denoted by newSnapName.

In at least one embodiment, determining that the baseSnap is valid 526b may include determining that the input parameter baseSnap denotes a valid existing snapshot of the specified source input parameter. It should be noted that if the foregoing 3 conditions 526a-c of the criteria are true or met, then the baseSnap refers to the most recent prior snapshot of the source (based on the matching snap gen IDs) and also that the most recent prior snapshot of the source has not been modified since that snapshot was taken.

If the criteria including the 3 conditions denoted by 526a-c are not met, the optimization to avoid creating a new replica or data path snapshot cannot be performed. In this case, if the criteria 526a-c are not all met (e.g., any one of them is false or the baseSnap is not specified), the step 526d is not performed and alternatively the control proceeds to 528 where the LSO 504 begins processing to create the new data path snapshot or replica. As denoted 528, the LSO 504 issues the request 528 to the usher component 506 to quiesce I/Os directed to the source and drain pending I/Os directed to the source. In particular, in response to receiving the request 528, the usher component 506 may temporarily pause any new I/Os directed to the source and allow pending or outstanding I/Os to the source to drain or complete. Once all pending I/Os directed to the source have completed, the usher components 506 returns control tp the LSO 504. The LSO 504 then issues a createReplica request 530 to the usher component 506 to create a new replica or data path snapshot of the source where the new replica or data path snapshot is associated with the control path snapshot identifier (ID) newSnapName. In response to receiving the request 530, the usher component 506 then issues a create replica request 532 to the namespace component 510.

Subsequent to the request 532 returning to the usher component 506 and with reference now to FIG. 3B, the usher component 506 also performs the processing denoted by 554. The element 554 indicates that if the isclean attribute associated with the source object is false thereby denoting that the source is dirty or not clean and has been modified since the last or most recent replica snapshot, perform the processing denoted by 554a-c. In response to determining the isclean flag associated with the source=false, the usher component 506 performs the following denoted by 554:

A). Refreshes the snap gen ID 554a associated with the source. Refreshing the snap gen ID includes generating a new or next snap gen ID denoting an updated copy of the source.

B) Updates the snap gen ID attribute of the source to be the new snap gen ID returned from 554b.

C) Sets the isclean attribute or flag associated with the source to clean or true 554c. In an embodiment having two nodes as described herein where the processing of FIGS. 3A and 3B is performed on a first node of the system, processing may be performed in 554c to also synchronize the isclean attribute flag of the source with the second peer node of the system to also be true.

Thus, the processing of the steps 554a-c may be conditionally performed only if the isclean attribute of the source is dirty.

Subsequently, the usher component 506 then sends a request 556 to the LSF 508 to set the attributes of the new replica or data path snapshot (e.g., as denoted by NewSnapObject). In particular, the request 556 includes setting the snap gen ID of the new replica or data path snapshot to be the current value of the snap gen ID associated with the source. It should be noted that the snap gen ID is only updated in the step 554a if the source is dirty and has been modified (e.g., modified user data or content) since the last or most recent snapshot of the source was taken. If the source is clean and has not been modified, then the processing of 554 is not performed and the snap gen ID is not updated whereby at the step 556, the snap gen ID of the newly created replica or data path snapshot is the same as the snap gen ID of the most recent replica or data path snapshot of the source.

Upon completion of the request 556, control returns from the LSF 508 to the usher component 506 and the usher component then unquiesces 558 the I/Os with respect to the source LUN. Unquiescing the source 558 may include resuming or restarting the I/Os that were temporarily suspended in connection with the request 528. In at least one embodiment, quiescing the I/Os 528 may include temporarily pausing any new I/Os received subsequent to the request 528. The pausing may include storing any new I/Os received into a queue or buffer. Now at the step 558, unquiescing may include restarting the I/Os to the source. The unquiescing may include commencing processing of any paused I/Os in the queue or buffer and also allowing additional I/O received subsequent to the processing point 558 to be serviced. After unquiescing 558, control returns 560 from the usher component 506 to the LSO 504. In turn, the LSO 504 returns an OK status 562 to the control path indicating that a new replica or data path snapshot instance was successfully created.

Figure 3C:
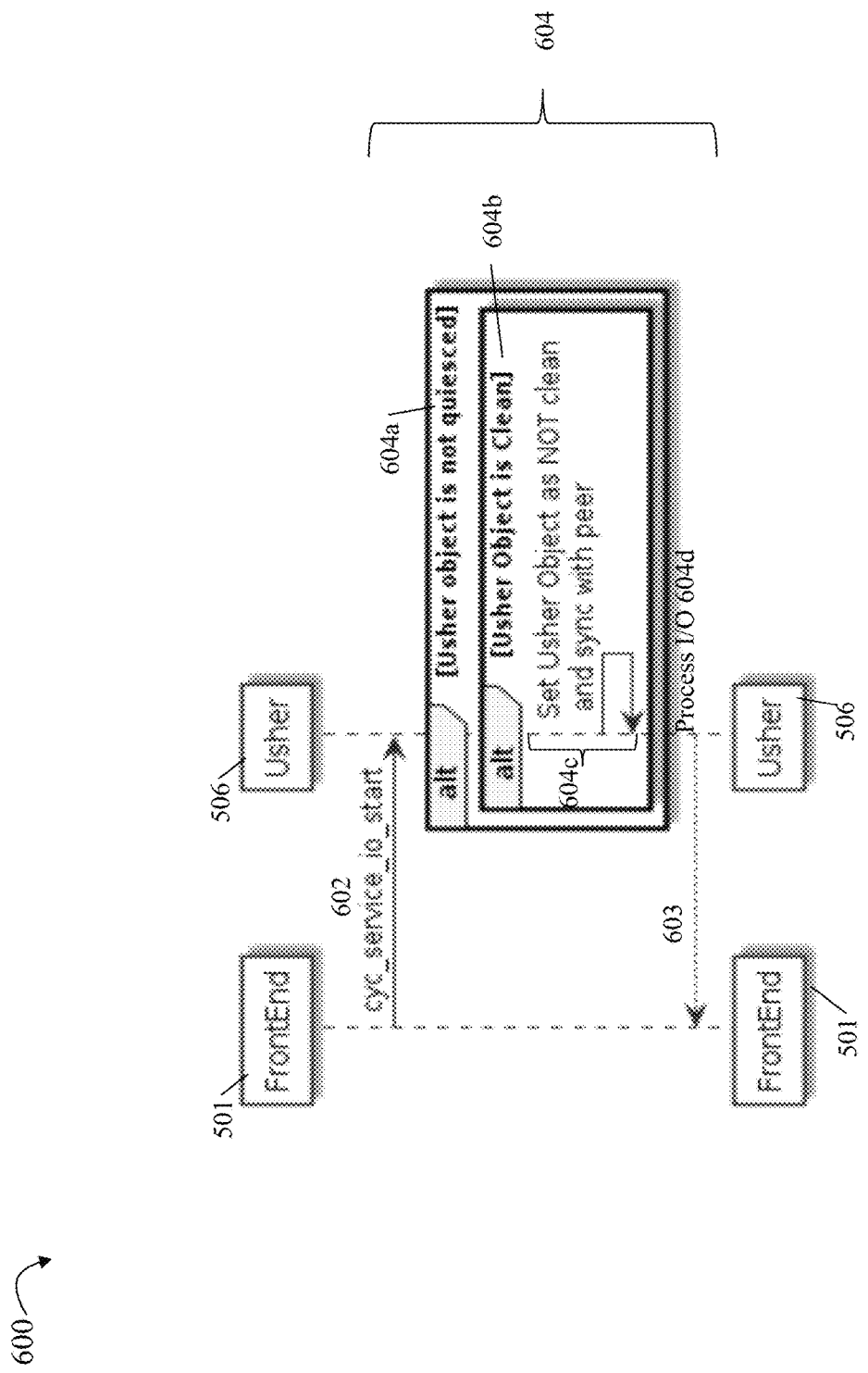

Referring to FIG. 3C, show is a sequence diagram 600 of processing that may be performed as part of the standard I/O or data path processing in connection with servicing a write I/O operation directed to a storage object in at least one embodiment in accordance with the techniques herein. The processing denoted by FIG. 3C may be performed in addition to other normal processing performed in connection with servicing a write I/O operation, or more generally, any operation that modifies or changes the content of the storage object. The front end component 501 and the usher component 506 may be as described above such as in connection with other figures. The front end 501 receives the write I/O operation such as a write operation and issues the request 602 to the usher component 506 to service the write operation. In response to receiving the request 602, the usher component performs processing to determine in the step 604a whether the I/Os directed to the storage object are being quiesced or not. If the I/Os are not being quiesced and 604a evaluates to true, control proceeds to the step 604b where a determination is made as to whether the isclean flag of the storage object is true. If the step 604b evaluates to true where isclean is true, control proceeds to the step 604c where processing is performed to set the isclean attribute to false or not clean and to send a message to the peer node to synchronize its copy of the isclean attribute to false. As a result, the step 604c is only performed when I/Os to the storage object are not being quiesced and also only when the isclean attribute is true. Subsequent to completing the processing denoted by the element 604, the I/O is processed 604d further on the data path such as, for example, by having the usher component 506 transfer control to another component of the data path, such as the system cache component. The element 604d may include, for example, storing the data written by the write I/O to the cache of a node. Consistent with other discussion herein such as in connection with FIG. 2A, the cached write data is then later destaged to physical storage of a BE PD provisioned for a LUN or logical device to which the write operation is directed. The element 604d may include the usher component 506 transferring control to other components on the data path as described herein. Subsequent to completing the I/O processing 604d, control returns back up the stack of the data path whereby the usher component 506 returns control 603 to the front end 501.

If the I/Os are being quiesced and the step 604a evaluates to false, the write I/O may be temporarily held or paused and may be place in a queue or buffer. If the write I/O is quiesced, once the I/Os to the object are unquiesced and restarted, the write I/O processing is removed from the queue and resumes or continues processing of the write I/O with step 604b.

To further illustrate use of the techniques herein, the following paragraphs provide a detailed example of the processing performed in connection with the FIGS. 3A and 3B in for a source storage object or simply a source that is a LUN. In the following examples, the source is the LUN A. Prior to a first point in time T1 noted below, there are no snapshots in existence for the LUN A.

Figure 4A:
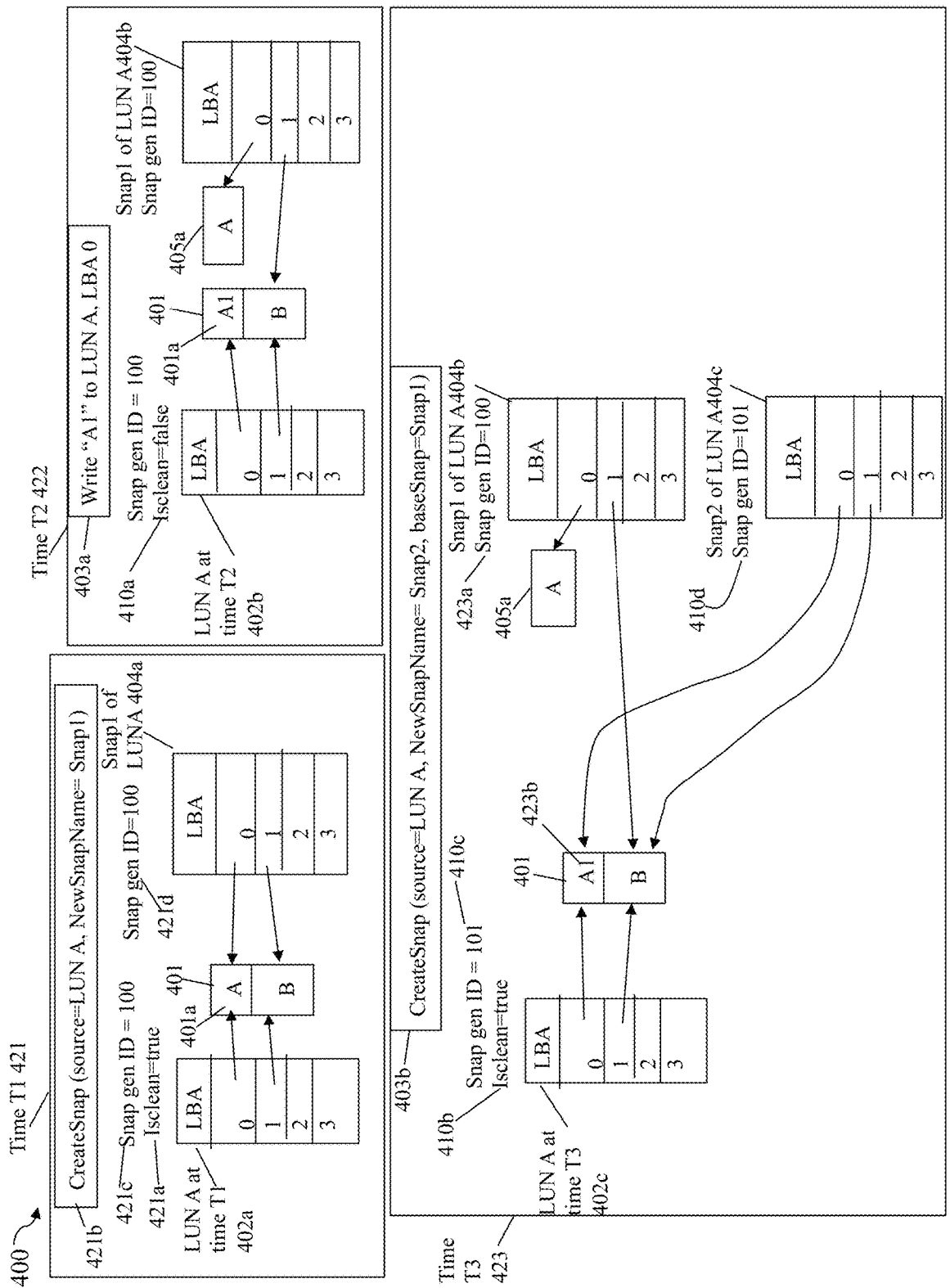
FIGS. 4A, 4B, 4C, 4D and 4E are more detailed examples illustrating processing that may be performed in an embodiment in accordance with the techniques herein.

Referring to FIG. 4A, shown is an example 400 illustrating use of the techniques herein in connection with a source system and the LUN A. The LUN A in this example includes only 4 LBAs 0-4 in its logical address space for simplicity of illustration.

The element 421 illustrates the structures of the source system at the first point in time T1 after creating a first snapshot Snap1 of the LUN A as a result of processing the command 421b. The command 421b may be a request submitted to the data path by the control path, for example, in response to a control path command from a user, or in response to a control path command issued by a scheduler that schedules taking snapshots of the LUN A in accordance with a LPP or RPP of LUN A. At the point in time T1, the command 421b may be a request submitted on the data path to create a new snap of LUN A, where the command 421b is: CreateSnap (source=LUN A, NewSnapName=Snap1). In the command 421b, the source is LUN A, and Snap 1 may denote the next new snap of LUN A created at the time T1. Since there are no existing snapshots of LUN A, there is no base snap of LUN A. In this case, consistent with other discussion herein with FIGS. 3A and 3B, processing of the command 421b may include creating a new snapshot on the data path by execution of the create replica command, assigning a snap gen ID of 100 (421c) to LUN A, and assigning a snap gen ID of 100 (421d) to Snap1.

At the time T1, the element 402a of 421 denotes the data stored at the LBAs of the LUN A. The element 401 denotes the physical storage locations containing the data stored on LUN A. The element 402a may be an array or vector of pointers where each entry of 402a corresponds to one of the LBAs of LUN A, and where if data has been written to the LBA of the entry, the entry points to or references a corresponding physical storage location of the element 401. For example, the element 402a indicates that at the first point in time T1, LUN A, LBA 0 has the content A; and LUN A, LBA 1 has the content B. As denoted by 402a, the remaining LBAs 2 and 3 of LUN A are not currently associated with any storage location meaning that there have not yet been any writes to such LBAs.

The element 404a of 421 represents the structure created for the new snapshot as a result of creating a new snapshot replica on the data path. For example, the structure 404a may be created as a result of executing the create replica command as described in connection with the elements 532 and 532 of FIG. 3A. The structure 404a denotes the content or data stored on the Snap1 of LUN A at the first point in time T1. The structure 404a may be an array or vector of pointers where each entry of 404a corresponds to one of the LBAs of the snap 1 of the LUN A, and where if data has been written to the LBA of the entry, the entry points to or references a corresponding physical storage location of the element 401. In particular, the structure 404a of 421 indicates that at the first point in time T1, the snap 1 of LUN A, LBA 0 has the content A; and the snap 1 of LUN A, LBA1 has the content B. The remaining LBAs of the snap 1 of LUN A are null and not currently associated with any storage location. Both the base LUN A and the Snap1 of LUN A have the same snap gen ID of 100. Additionally, the attribute isclean 421a is true.

The element 422 illustrates the structures of the source system at a second point in time T2 subsequent to T1 after processing a received write I/O operation 403. At the second point in time T2, the write I/O operation 403a may be received from a host connected to the source system. The write 403a may write the data content "A1" to LUN A, LBA 0. The structure 404b of 422 denotes an updated version of the structure 404a for snap 1, where the structure 404b has been updated as a result of the write processing performed for the write operation 403a. The structure 402b of 422 denotes an updated version of the structure 402a of 421 for the LUN A, where the structure 402b has been updated as a result of the write processing performed of the write 403a. The write processing of the write 403a may include storing the data content "A1" in a cache location associated with the logical address LUN A, LBA 0, and, at a later point in time, the cache location may be destaged or flushed to physical storage location 401a of the source system. Before overwriting the physical location 401a with the new write data "A1", the current content "A" of the physical location 401a may be copied to a new physical location 405a, and the entry 422a (referencing the data stored at LBA 0 of snap 1 of LUN A) may be updated to now reference the new physical location 405a containing the current content "A". Additionally, at the second point in time T2, the write processing may include setting the isclean attribute 410a to false such as described in connection with FIG. 3C processing.

The element 423 illustrates the structures of the source system at a third point in time T3 subsequent to T2 after processing the received command 403b. Similar to the command 421b of 421, the command 403b may be a request submitted to the data path by the control path. At the third point in time T3, the command 403b may be received to create another new snap of LUN A, where the command 403b is: CreateSnap (source=LUN A, NewSnapName=Snap2, baseSnap=Snap1). In the command 403b, the source is LUN A, Snap2 may denote the next new snap of LUN A created at the time T3, and Snap 1 is the base snapshot. Processing as described in connection with FIGS. 3A and 3B may be performed where a new snapshot for Snap2 is created on the data path by execution of the create replica command. Creating the new snapshot instance for Snap 2 on the data path may result in creating the instance of the structure 404c. The structure 404c denotes the data stored on the Snap2 of LUN A at the point in time T3. In particular, the structure 404c indicates that at time T3, the snap 2 of LUN A, LBA 0 has the content A1; and the snap 2 of LUN A, LBA1 has the content B. As also denoted by the structure 404c, the remaining LBAs 2 and 3 of the snap 2 of LUN A are null and not currently associated with any storage location. The structure 404b created for the Snap1 of LUN A is as described in connection with the element 422 associated with the time T2. As a result of processing the create snapshot command 403b, the snap gen ID 410b associated with the LUN A is updated to 101, the attribute isclean associated with LUN A is set to true, and the snap gen ID associated with snap 2 is set to 101 (as denoted by 410d).

In connection with the time T2 as denoted by the element 422, both the LUN A and the Snap1 of LUN A have the same snap gen ID of 100. However, the isclean attribute 410a associated with the LUN A is false. As a result when subsequently processing the command 403b of the element 423 and as described in connection with the processing of 526 of FIG. 3A, although the snap gen IDs of the LUN A and the base Snap1 match, the attribute isclean 410a associated with the LUN A is false. As such the step 526d of FIG. 3A is not performed and rather control is transferred to the step 528 of FIG. 3A, where processing continues and the new snapshot Snap 2 is created on the data path by executing the create replica command (530, 532 of FIG. 3A).

Figure 4B:
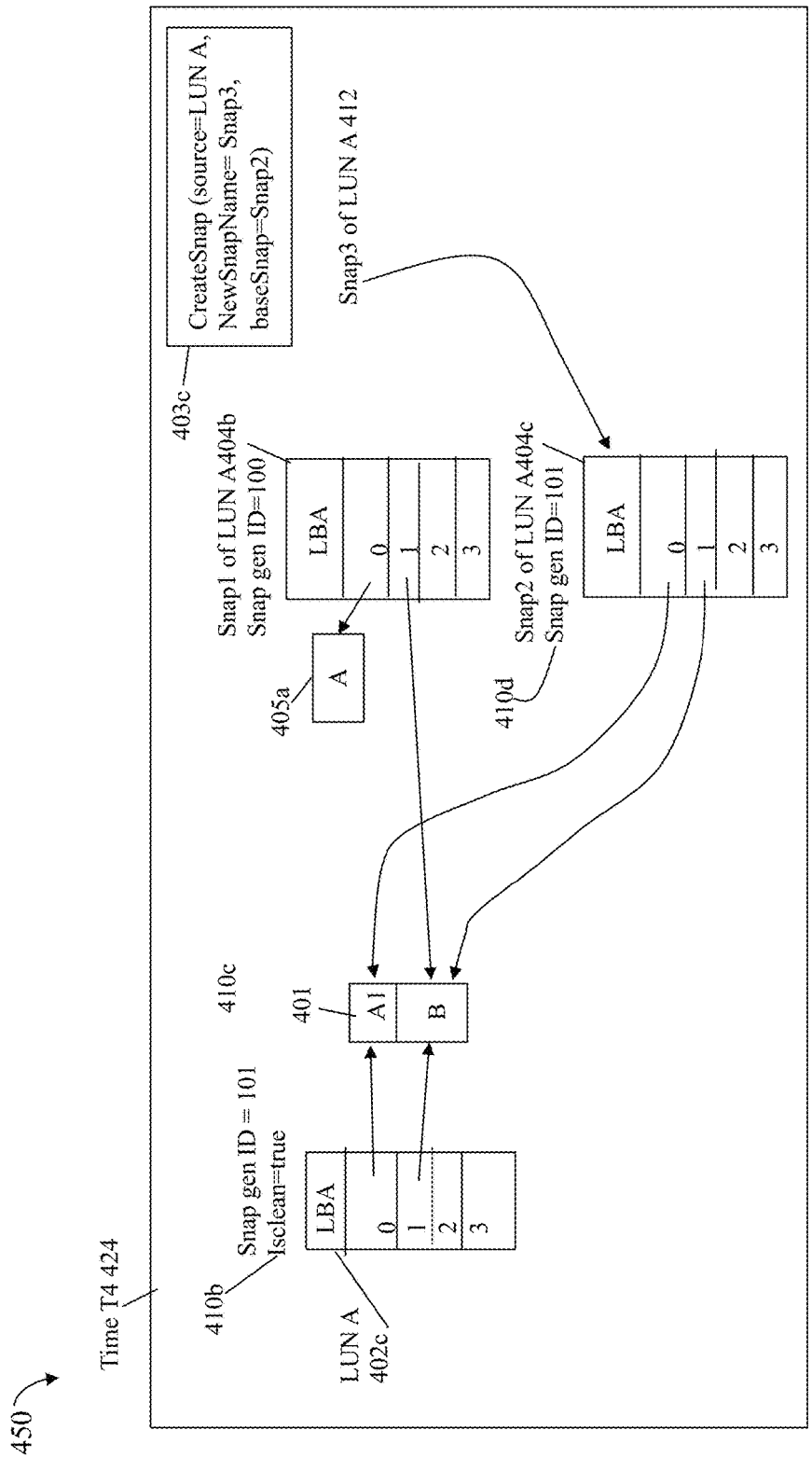

The element 424 of FIG. 4B illustrates the structures of the source system at a fourth point in time T4 subsequent to T3 after processing the received command 403c. Similar to the commands 403b and 421b, the command 403c may be a request submitted to the data path by the control path. At the time T4, the command 403c may be received to create another new snap of LUN A. where the command 403b is: CreateSnap (source=LUN A, NewSnapName=Snap3, baseSnap=Snap2). In the command 403c, the source is LUN A, Snap3 may denote the next new snap of LUN A created at the time T4, and Snap2 is the base snapshot. Processing as described in connection with FIG. 3A may be performed where, as an optimization in accordance with the techniques herein, a new snapshot is not created on the data path by execution of the create replica command. Rather at the time T4 consistent with the description of FIG. 3A in accordance with the techniques herein, there is no new replica created and no new instance of a snapshot data structure created (e.g., with reference to FIG. 3A in connection with FIG. 4B, the 3 conditions of the criteria 526a-c are true and control proceeds to the step 526d to return to the control path without creating a new replica or data path snapshot). In particular with reference to the element 423 corresponding to the time T3 prior to T4, the LUN A and Snap2 (the base and most recent snapshot of LUN A) have the same snap gen ID of 101 as denoted respectively by the elements 410c-d. Additionally, the attribute isclean 410b of the LUN A is true and the base snapshot Snap2 is valid. As such, there is no need to create another replica as a new data path snapshot. Rather, as illustrated by the element 412 in FIG. 4B, the snapshot Snap3 may be associated with and reference the existing replica and structures of the Snap2 404c. In one aspect, the element 412 illustrates that an entry or entity for the Snap3 may be created on the control path. In accordance with the techniques herein, the Snap3 may be implemented by referencing Snap2 404c without creating a new replica on the data path. Consistent with other discussion herein, creating a new replica denoting a physical snapshot instance may include creating the necessary one or more structures that represent the point in time data copy corresponding to the physical snapshot or replica. In this manner, the control path may have a handle, reference or entry for each snapshot created where each snapshot may be implemented by either creating a new replica on the data path (as represented by the structures used to implement each replica) or by referencing an existing replica of a prior snapshot. In one aspect, a structure such as denoted by the element 404a or 404c of FIG. 4A may be created to represent the replica as a point in time copy or snapshot. The snapshot as represented on the control path may be associated with a replica and, in accordance with the techniques herein, a single replica or physical snapshot such as denoted by the structure 404c may be associated with multiple logical snapshots as presented to a user on the control path. Put another way, the structures 404b, 404c denote two replicas or point in time copies of the LUN A. The snapshot Snap1 of LUN A corresponds to the first replica or first point in time copy of LUN A denoted by the structure 404b. The snapshot Snap2 of LUN A corresponds to the second replica or second point in time copy of LUN A denoted by the structure 404c. Additionally, the snapshot Snap3 of LUN A also corresponds to the second replica or point in time coy of LUN as denoted by the structure 404c.

Figure 4C:
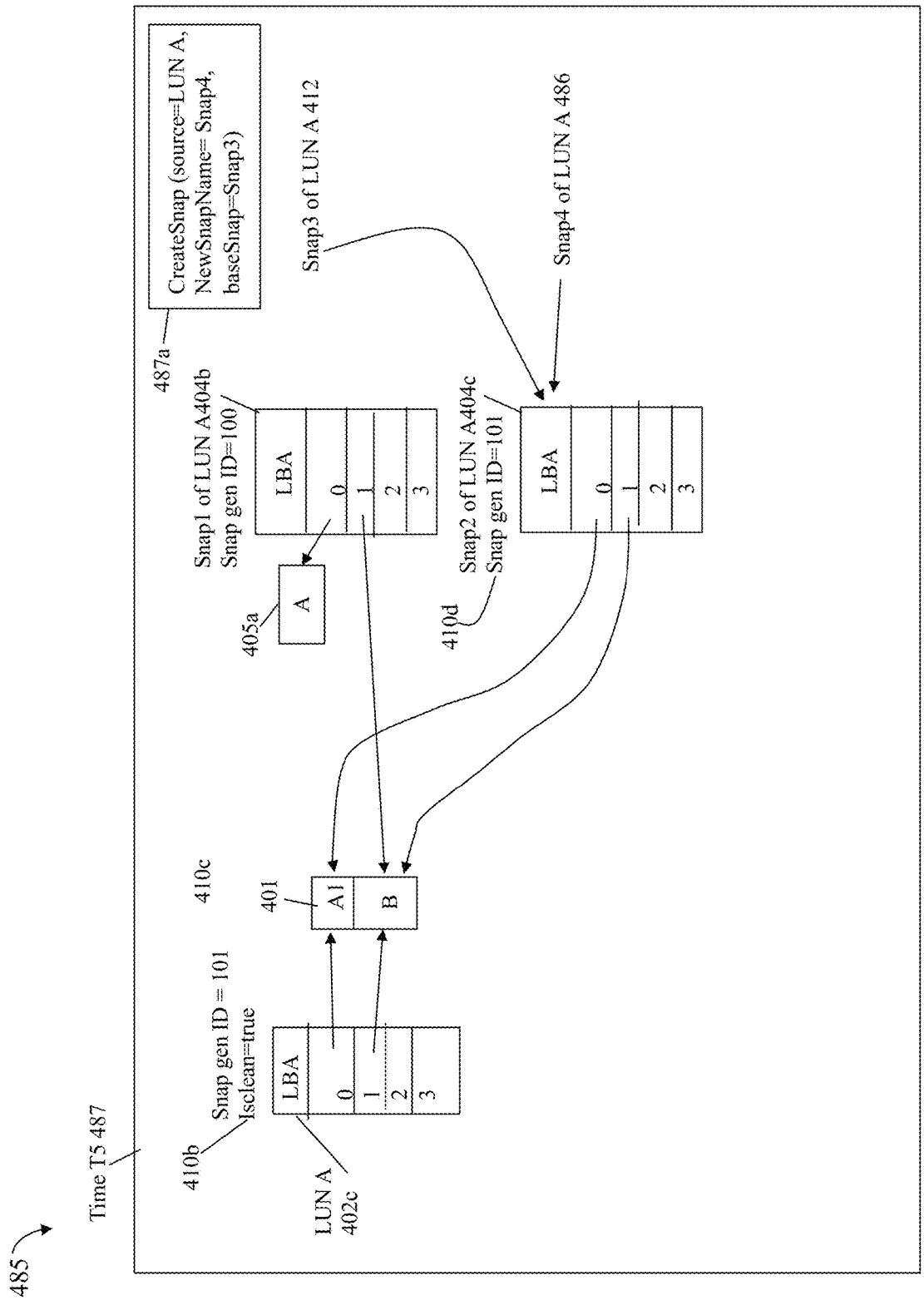

As a further illustration with reference to FIG. 4C, consider a fifth point in time T5 subsequent to T4 where at the time T5, the create snapshot command 487a is received: "CreateSnap (source=LUN A, NewSnapName=Snap4, baseSnap=Snap3), where the source is LUN A, Snap4 may denote the next new snap of LUN A created at the time T5, and Snap3 is the base snapshot. Similar to the commands 403b-c and 421b, the command 487a may be a request submitted to the data path by the control path. The element 487 illustrates the state of the source system after processing the command 487a as described herein such as based on the processing of FIGS. 3A and 3B. At the time T5, assume that there have been no writes to the LUN since the Snap3 was created. In this case, the Snap4 486 may also be associated with or reference the replica 404c of Snap2.

Figure 4D:
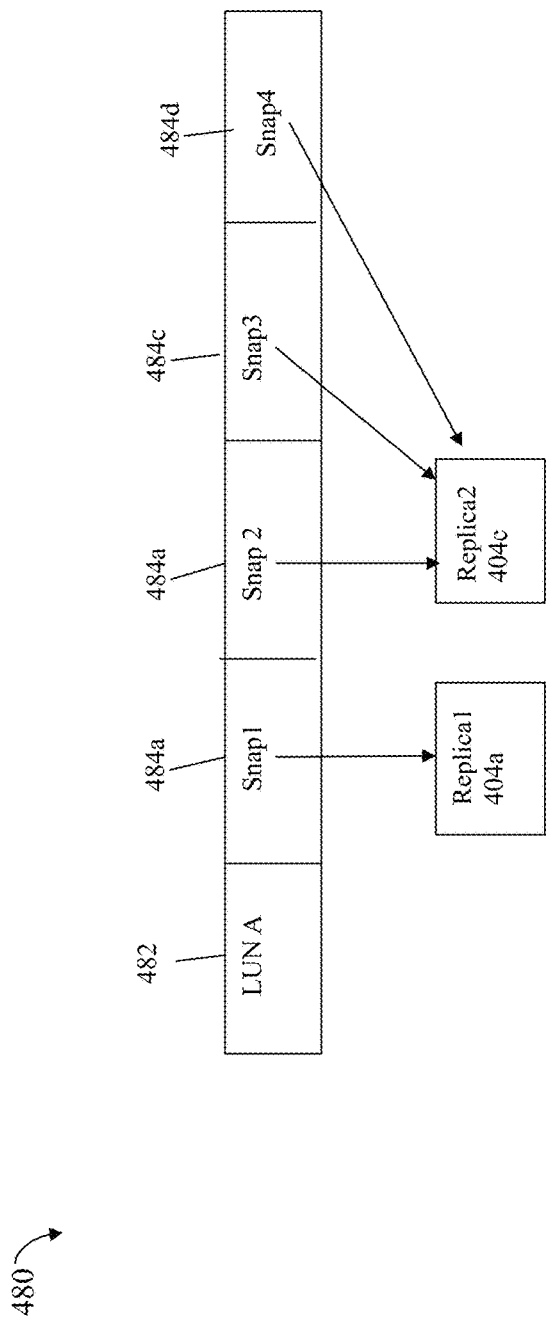

Referring to FIG. 4D, shown is an example illustrating an association between the snapshots of LUN A and the replicas of LUN A in an embodiment in accordance with the techniques herein. The example 480 represents the associations between the 4 snapshots and the 2 replicas created in connection with the points in time T1-T5 described above. The element 482 indicates that the source LUN is LUN A having 4 snapshots 484a-d created on the control path. Each of the snapshots 484a-d may denote a control path command executed to create a new snapshot of the LUNA, which in turn, results in submitting a CreateSnap request to the data path. In accordance with the techniques herein, each CreateSnap request to the data path may or may not result in creation of a new replica or new instance of a point in time copy as represented by one or more structures (e.g., such as the structures 404a-c). Each control path command to create a new snapshot of LUN A triggering a CreateSnap data path request may be executed, for example, on demand by a user, as part of a data protection schedule based on a LPP or RPP, and the like. Each of the snapshots 484a-d may be characterized as a logical instance of a snapshot from the control path point of view, where each of the snapshots 484a-d is associated with a replica denoting a physical instance of a snapshot created on the data path by the necessary data structure(s) representing the point in time copy of the physical snapshot instance or replica. In the example 480, the snapshot 484a is associated with replica 1 such as represented by the structures 404a-b of FIGS. 4A and 4B, and the snapshots 484b-d are associated with replica2 such as represented by the structure 404c of FIG. 4B.

Figure 4E:
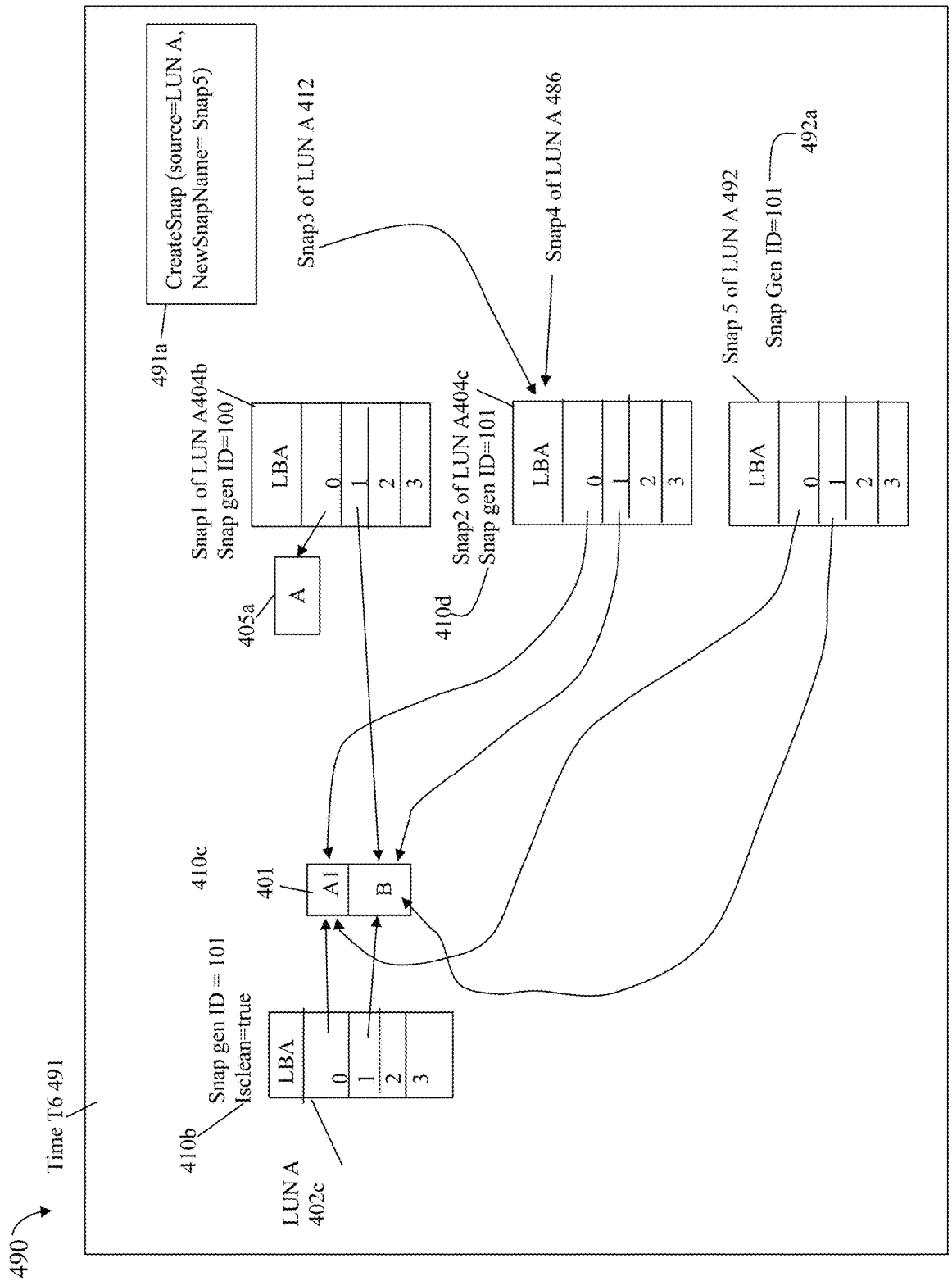

As a further illustration with reference to FIG. 4E, consider a sixth point in time T6 subsequent to T5 where at the time T6, the create snapshot command 491a is received: "CreateSnap (source=LUN A, NewSnapName=Snap5), where the source is LUN A, and Snap5 may denote the next new snap of LUN A created at the time T6. Note that no base snap is specified in the command 491a. Similar to the commands 403b-c, 421b and 487a, the command 491a may be a request submitted to the data path by the control path. The element 491 illustrates the state of the source system after processing the command 491a as described herein such as based on the processing of FIGS. 3A and 3B. At the time T6, assume that there have been no writes to the LUN since the Snap2 having the associated replica 404c was created.

In at least one embodiment, the CreateSnap command, or more generally the create snapshot command, may include a base snap parameter. The base snap parameter may be an optional parameter where the command 491a is an example illustrating a case where the base snap parameter is omitted. In such an embodiment, a new replica or data path snapshot instance may be created even if the content of the new replica matches the last or most recent prior replica or data path snapshot instance. The processing of the command 491a may include creating the new replica or data path snapshot instance denoted by the structure 492 for Snap5, and assigning Snap5 the snap gen ID=101 492a. The processing of the command 491a does not result in updating the snap gen ID of the LUN A since isclean 410b is true (thereby denoting that the LUN A has not been modified since the last or most recent replica or data path snapshot instance was created (e.g., see element 554 of FIG. 3B which only updates the snap gen ID in the steps 554a-c if isclean is false or not clean).

In FIG. 4E, it is noted that the two replicas or data path snapshots 404c and 492 have the same snap gen ID of 101 thereby denoting that both of the replicas have identical content. However, if the base snap parameter is omitted from the command 491a, one embodiment as described may create the new replica 492 even though there have been no changes to the source LUN A since the last or most recent replica 404c (associated with the Snap2 404c, snap3 412 and snap4 486).

In at least one embodiment, the snapshot names, such as Snap1, Snap2, Snap3, Snap4 and Snap5 in connection with the above example, may also be referred to as snapshot identifiers (IDs) denoting different snapshots from the control path point of view as discussed elsewhere herein. Each of the snapshot IDs may be associated with a replica or data path snapshot denoting a different logical point in time copy of LUN A. For example, with reference to the time T6 and FIG. 4E, there are 3 replicas or data path snapshots denoted by the structures 404b, 404c and 492. The 3 replicas have content corresponding to logical point in time copies of LUN A as represented by the structures 404b, 404c and 492. At the time T6 and as represented in FIG. 4E, the snapshot ID Snap1 may be associated with the replica 404b; the snapshot IDs Snap2, Snap3 and Snap4 may be associated with the replica 404c; and the snapshot ID snap5 may be associated with the replica 492.

A snapshot create request such as illustrated by the CreateSnap requests noted above may be one operation performed frequently to create snapshots forming the basis for many different services or tasks such as, for example, local data protection as well as remote protection such as remote replication. In at least one embodiment, asynchronous remote replication may use the snapshot difference or snap diff technique also discussed elsewhere herein. With the snap diff technique, snapshots of a LUN such as LUN A of FIGS. 4A-4E may be taken at scheduled periodic time intervals such as in accordance with a specified RPO. Each new snapshot of LUN A may be taken, for example, by the control path issuing the CreateSnap request with the LUN A as the source as described in connection with FIGS. 3A and 3B.

After a new snapshot of the LUN A is requested upon the next occurrence of a time interval based on the RPO, the data difference between the new snapshot of LUN A and the most recent prior snapshot of LUN A are compared to determine what data of the new snapshot has been modified or changed, if any, since the most recent prior snapshot. Any changed data since the most recent prior snapshot is replicated to the target system. For example, with reference back to FIG. 4A, assume Snap1 of LUN A is created at time T1 as an initial snapshot of LUN A when establishing asynchronous remote replication for LUN A. Assume that the time T3 has an associated state as represented by element 423 of FIG. 4A, where T3 denotes the next time interval when a new snapshot, Snap2, is taken of LUN A based on the RPO of the RPP for LUN A. At the time T3, the data difference between the Snap1 and Snap2 of LUN A may be determined. In at least one embodiment in accordance with the techniques herein with reference to the element 423 of FIG. 4A, determining the data difference at the time T3 between the Snap1 associated with the replica 404b and the Snap2 associated with the replica 404c may include comparing the snap gen IDs of Snap1 and Snap2. The element 423a denotes the snap gen ID=100 for the snap 1 404b, and the element 410d denotes the snap gen ID=101 for the Snap2 404c. If the snap gen IDs of the two snapshots Snap 1 and Snap 2 match, the two snapshots have identical content and do not have to be processed any further to determine data differences. Otherwise, if the snap gen IDs of the two snapshots do not match, then additional processing is performed to determine specifically what data blocks of Snap2 have changed or been modified since Snap1 was taken. In connection with the example of FIG. 4A at the time T3, the snap gen IDs of the snapshots Snap1 404b and Snap2 404c do not match and it can be determined that snapshots Snap1 and Snap 2 of LUN A do not have matching or identical content. Further data comparison of the two snapshots Snap1 404b and Snap 2 404c indicate that only the content of LBA 0 of LUN A was modified since Snap 1 was taken. Accordingly, the content of LUN A, LBA 0 associated with Snap2 may be replicated to the target system. In particular, the data "A1" of LUN A, LBA 0 in connection with Snap2 is stored at physical storage location 423b so processing is performed to read "A1" from location 423b and transfer the data "A1" to the target system for replication.

With reference back to FIG. 4B, assume that the time T4 denotes the next time interval based on the RPO for the RPP for LUN A that a snapshot is taken for LUN A. At the time T4, the Snap3 412 of LUN A is taken. In this case, the Snap3 412 and the prior Snap 2 404c are associated with the same replica 404c and thus both have the snap gen ID=101 (410d), and it may be determined that the Snap2 and the Snap3 of LUN A have identical content and there is no changed data to be remotely replicated.

With reference back to FIG. 4C, assume that the time T5 denotes the next time interval based on the RPO for the RPP for LUN A that a snapshot is taken for LUN A. At the time T5, the Snap4 486 of LUN A is taken. In this case, the Snap4 486 and the prior Snap 3 412 are associated with the same replica 404c and thus both have the snap gen ID=101 (410d), and it may be determined that the Snap4 and the Snap3 of LUN A have identical content and there is no changed data to be remotely replicated.

With reference back to FIG. 4E, assume that the time T6 denotes the next time interval based on the RPO for the RPP for LUN A that a snapshot is taken for LUN A. At the time T6, the Snap5 492 of LUN A is taken. In this case, the Snap5 492 and the prior Snap 4 486 are associated with different replicas. In particular, the Snap5 492 (associated with the replica 492) has a snap gen ID=101 (492a) and the Snap4 486 (associated with replica 404c) has a snap gen ID=101.

Even though both Snap4 and Snap5 have different replicas, both have the snap gen ID=101, and it may be determined that the Snap4 and the Snap5 of LUN A have identical content and there is no changed data to be remotely replicated.

In this manner, an embodiment in accordance with the techniques herein may perform an optimization in connection with determining the data differences between two snapshots of a source object such as LUN A using the snap gen IDs of the snapshot IDs and associated replicas. As described above, rather than perform data comparisons of the content of two snapshots, the snap gen IDs of the two snapshots may be compared and, if identical, provide for efficiently determining that the content of the two snapshots is also identical.

Described above in connection with FIGS. 3A and 3B, shown is an example of processing performed for a request to create a single snapshot of a single source. In at least one embodiment, support may be included for creating a snapshot of a group of source objects or sources with a single snapshot creation request.

Figure 5A:
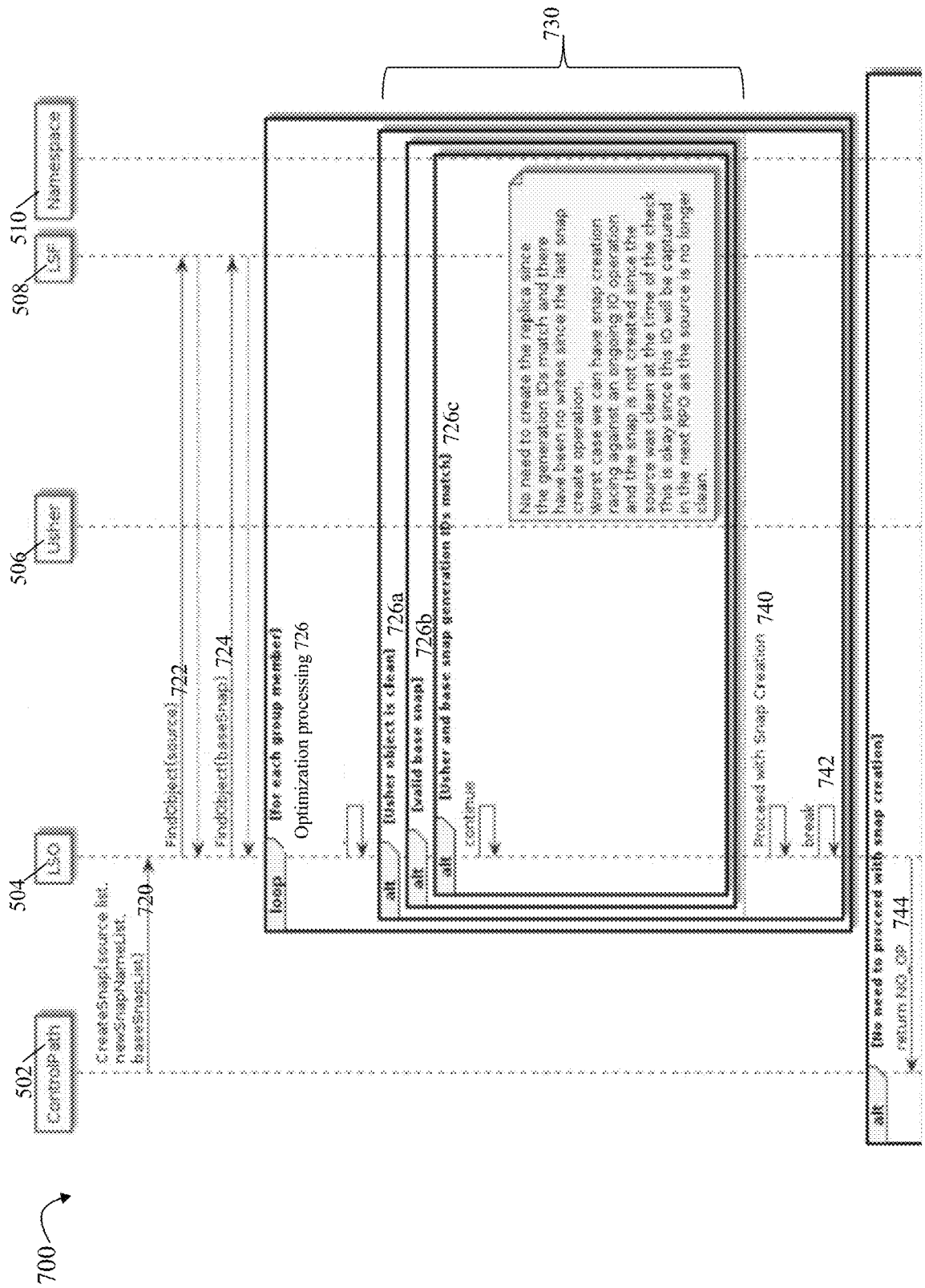
Figure 5B:
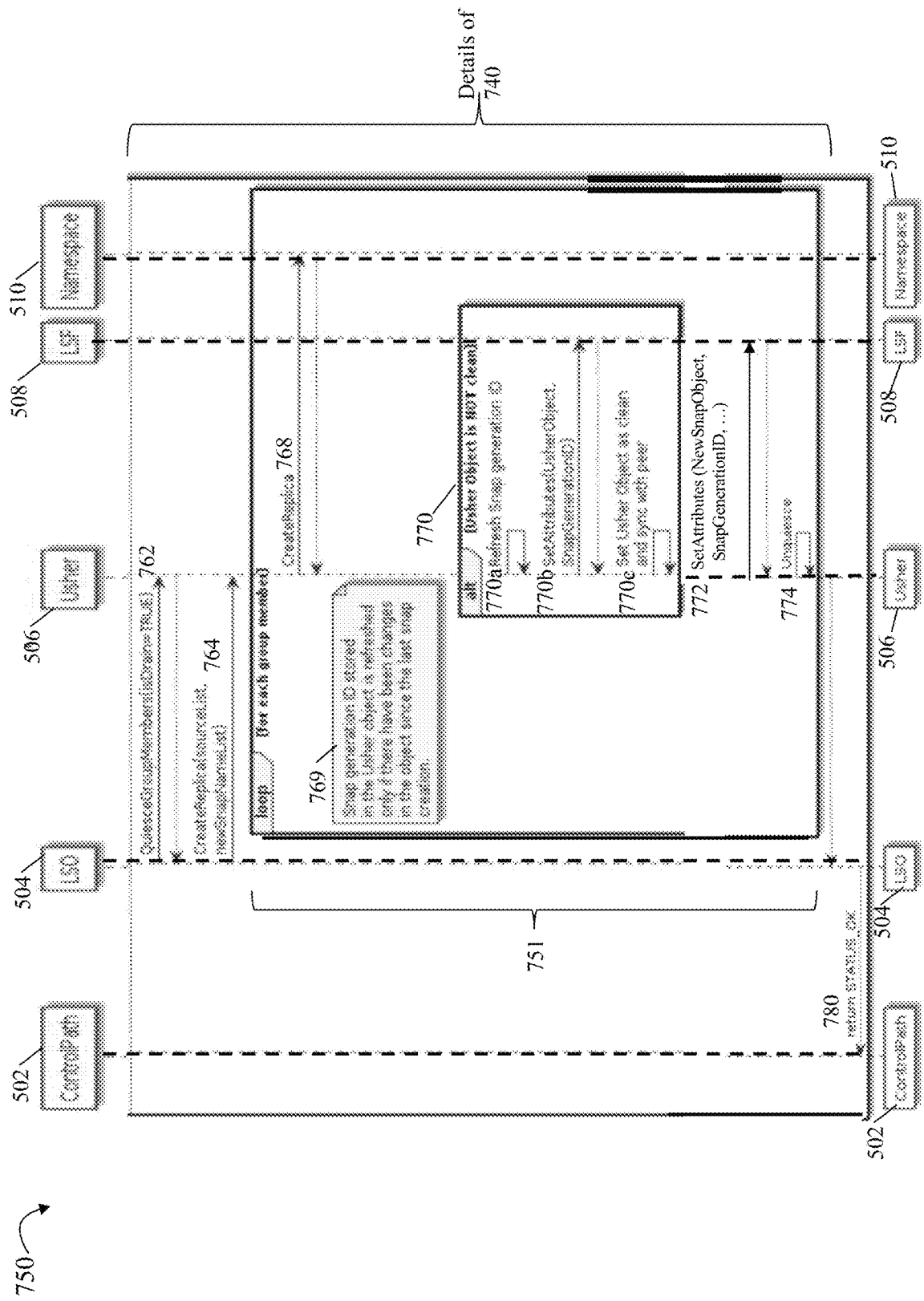

Referring to the FIGS. 5A and 5B, shown are sequence diagrams described below for issuing a snap creation request for a group of multiple sources in at least one embodiment in accordance with the techniques herein.

Generally, the processing illustrated in the FIGS. 5A and 5B is similar to that as described above in connection with FIGS. 3A and 3B for a single source with the following differences:

1) the snapshot creation request returns a NO_OP only if the 3 conditions or criteria as described in connection with FIGS. 3A and 3B hold true for all of the sources of the group; and 2) It is possible for one or more sources of the source group to be dirty (e.g., have an associated isclean attribute=false) and for one or more other sources of the source group to be clean (e.g., have an associated isclean attribute=true). In at least one embodiment as described below in connection with FIGS. 5A and 5B, new replicas or data paths snapshots are created for all sources of the source group. For each new replicas created for a clean source, the snap gen ID of the new replica is the same as the base snap. For each new replica created for a dirty source, the snap gen ID of the new replica is assigned an updated snap gen ID (e.g., refreshed as denoted in 770a of FIG. 5B) that is different than the base snap.

Although not illustrated in the FIGS. 5A and 5B, an alternative embodiment may vary from the step 2) above where new replicas or data path snapshots may be selectively created only for those sources that are dirty or not clean. In this latter case, the control path code to which control is returned may need modification to handle this possible variation.

Referring to the example 700 of FIG. 5A, the control path 502 issues a request to create snapshots for a group of sources by issuing the following request 720: CreateSnap (source list, newSnapNameList, baseSnapList) where:

source list is a list of one or more sources where the request is being issued to create a new snapshot or replica for each of the sources;

newSnapNameList is a list of the names of the new snapshots to be created; and baseSnapList is a list of base snaps or snapshots used for the sources of the source list.

In at least one embodiment, each of the input parameters source list, newSnapNameList, and baseSnapList of the request 720 may be a list of multiple items where there is a positional association presumed between each Nth item on each of the lists. For example, the first source of the source list has an associated name as denoted by the first name of the newSnapNameList, and the first source has an associated base snap as denoted by the first name of the baseSnapList.

The control path 502 sends the request 720 to the LSO 504 that then requests and receives 722 each source of the source list, and requests and receives 724 each baseSnap of the baseSnapList. For each source or group member of the source list, processing 726 is performed to determine whether the 3 conditions of the criteria as described in connection with FIGS. 3A and 3B are true and thus whether an optimization may be performed where control passes to the step 744 to return No_op to the control path 502 without creating any new replicas or data path snapshots for the sources of the source list. In particular, the processing performed includes determining, for each source of the source list whether:

the isclean attribute of the source is clean or true (726*a*);
the base snap for the source is valid (726*b*); and
the snap gen ID of the source matches the snap gen ID of the base snap of the source (726*c*).

If all the conditions of the criteria 726*a-c* are true for each source of the source list, then control proceeds to the step 744. Otherwise, if all the conditions of the criteria 726*a-c* do not hold true and not met for all sources of the source list, then control proceeds to the step 740 processing to create new replicas or data path snapshots for all sources of the source list.

Referring to FIG. 5B, shown is a sequence diagram 750 illustrating in more detail the processing of the step 740 to create the new replicas or data path snapshots for the sources of the source list.

The LSO 504 issues the request 762 to quiesce the I/Os of sources of the source list. Quiescing of I/Os with respect to a single source is described elsewhere herein. With the request 762, the quiescing is performed with respect to all sources of the source list and includes temporarily suspending any newly received or subsequent I/Os directed to the sources and draining or completing any pending I/Os in progress. Once all pending I/Os directed to the source LUNs have been drained, the LSO 504 issues the request 764 to the usher component 506 to create replicas for the sources in the source list. For each group member or source of the source list, processing as denoted by 751 may be performed.

As denoted by the element 751, for each source, the usher component 506 issues a create replica request 768 to the namespace component 510. Subsequently, the usher component 506 performs processing as denoted by 770. The processing of the element 770 is similar to the element 554 of FIG. 3B. The element 770 indicates that if the isclean attribute associated with the source object is false thereby denoting that the source is dirty or not clean and has been modified since the last or most recent replica snapshot, perform the processing denoted by 770*a-c*. In response to determining the isclean flag associated with the source=false, the usher component 506 performs the following denoted by 770:

A). Refreshes the snap gen ID 770*a* associated with the source. Refreshing the snap gen ID includes generating a new or next snap gen ID denoting an updated copy of the source.

B) Updates the snap gen ID attribute of the source to be the new snap gen ID returned from 770*b*.

C) Sets the isclean attribute or flag associated with the source to clean or true 770*c*. In an embodiment having two nodes as described herein where the processing of FIGS. 5A and 5B is performed on a first node of the system, processing may be performed in connection with 770*c* to also synchronize the isclean attribute flag of the source with the second peer node of the system to also be true.

Thus, the processing of the steps 770*a-c* may be conditionally performed only if the isclean attribute of the source is false or dirty.

Subsequent to the processing of 770, the usher component 506 then sends a request 772 to the LSF 508 to set the attributes of the new replica or data path snapshot (e.g., as denoted by NewSnapObject). In particular, the request 772 includes setting the snap gen ID of the new replica or data path snapshot to be the current value of the snap gen ID associated with the source. It should be noted that the snap gen ID is only updated in the step 770*a* if the source is dirty and has been modified (e.g., modified user data or content) since the last or most recent snapshot of the source was taken. If the source is clean and has not been modified, then the processing of 770 is not performed and the snap gen ID is not updated in 770*a* whereby at the step 772, the snap gen ID of the newly created replica or data path snapshot is the same as the snap gen ID of the most recent replica or data path snapshot of the source.

Upon completion of the request 772, control returns from the LSF 508 to the usher component 506 and the usher component then unquiesces 774 the I/Os with respect to the source LUN. Unquiescing the source 774 may include resuming or restarting the I/Os that were temporarily suspended in connection with the request 762. In at least one embodiment, quiescing the I/Os for the sources may include temporarily pausing any new I/Os for the sources received subsequent to the request 762. The pausing may include storing any new I/Os received into a queue or buffer. Now at the step 774, unquiescing may include restarting the I/Os to the single source or group member being processing. The unquiescing may include commencing processing of any paused I/Os in the queue or buffer and also allowing additional I/O received subsequent to the processing point 774 to be serviced. After unquiescing 774 a current source, processing as denoted by the loop 751 continues with the next source in the source list until all such sources of the source list have been processing by 751.

After all sources of the source list have been processed by the loop 751, control returns to the LSO 504 which then returns 780 a status of OK to the control path 502. The status of OK 780 indicates that the replicas or data paths snapshots for all sources of the source list have been successfully created.

In at least one embodiment, additional operations besides write I/Os to a storage object such as a LUN may be result in either marking the isclean attribute associated with the LUN to dirty (e.g., set to false), or changing the snap gen ID associated with the LUN. In such an embodiment, the following additional operations affect either the isclean attribute of a storage object or result in changing the snap gen ID associated with the object. For example, consider a storage object such as a LUN:

1. An unmap operation may be performed to unmap physical storage from the logical address space of the LUN. In this case the unmap operation results in marking the isclean attribute of the LUN or other object as dirty.

2. A CAW or compare and write operation includes performing a comparison between a target location and a value and if the comparison is true, data is written to the target location. The CAW performs such processing atomically as a single operation. For a CAW operation that results in updating content of a LUN or other object, the object is marked as dirty by setting the isclean attribute to false.

3. A restore operation may be performed that restores an object such as a LUN from a snapshot or clone of the LUN. In at least one embodiment, the restore operation may replace the data or content from the snapshot or clone to the LUN. However, the LUN attributes may remain unchanged meaning that the snap gen ID for the LUN will remain same as prior to the restore operation. As such, in connection with a restore operation, the LSO needs to additionally set the snap gen ID of the LUN to match the snap gen ID of the source of the snap restore operation. Additionally, the isclean attribute associated with the LUN needs to be set to true or clean.

4. A refresh operation may be performed that refreshes an object such as a LUN from a snapshot or clone of the LUN. In at least one embodiment, the refresh operation may replace the data or content from the snapshot or clone to the LUN as with the restore operation. Additionally with the refresh operation, the LUN attributes are also modified to those of the snapshot or clone. Additionally, processing for the refresh operation includes setting the isclean attribute of the LUN to true.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of creating and using snapshots comprising:
receiving a request to create a new snapshot of a source object;
determining that a first generation identifier associated with the source object matches a second generation identifier associated with a base snapshot of the source object;
determining that the source object has been modified since the base snapshot was created; and
responsive to determining that the first generation identifier matches the second generation identifier and also determining that the source object has not been modified since the base snapshot was created, associating the new snapshot with the base snapshot thereby indicating that the new snapshot and the base snapshot have matching content and denote a same point in time copy of the source object.

2. The method of claim 1, wherein the source object is a storage object representing any one of a logical device, a file, a file system, a directory and a virtual volume used by one or more virtual machines.

3. The method of claim 1, wherein the request to create the new snapshot is issued from a control path.

4. The method of claim 3, wherein the request is issued by a scheduler component in accordance with a defined periodic time interval at which snapshots of the source object are taken.

5. The method of claim 4, wherein the defined periodic time interval is included in a local protection policy specified for the source object.

6. The method of claim 4, wherein the defined periodic time interval is a recovery point objective of a remote protection policy specified for the source object.

7. The method of claim 6, wherein the remote protection policy specifies an asynchronous remote replication configuration for the source object, and wherein the asynchronous remote replication configuration includes the source object of a source data storage system configured with a target object as a remote counterpart for the source object, and wherein a remote replication facility automatically replicates modifications of the source object to the target object.

8. The method of claim 7, wherein the remote replication facility uses a snapshot difference technique that performs processing including:
taking two successive snapshots of the source object; and
determining the data difference with respect to the two successive snapshots, wherein the data difference denotes data blocks of the source object that have been modified in the time interval between the two successive snapshots, wherein the data blocks that have been modified are replicated from the source system to the target system and applied to the target object.

9. The method of claim 8, wherein said determining the data difference with respect to the two successive snapshots includes:
determining that a third generation identifier associated with a first snapshot of the two successive snapshots matches a fourth generation identifier associated with a second snapshot of the two successive snapshots; and
responsive to determining that the third generation identifier matches the fourth generation identifier, determining that the two successive snapshots have matching content, and otherwise determining that the two successive snapshots do not have matching content.

10. The method of claim 9, wherein the first snapshot and the second snapshot are associated with a same replica of the source object, wherein the replica denotes a particular point in time copy of the source object.

11. The method of claim 10, wherein the first snapshot and the second snapshot are associated with a same set of one or more data structures representing the same replica denoting the particular point in time copy of the source object.

12. The method of claim 9, wherein the first snapshot is associated with a first replica of the source object and the second snapshot is associated with a different second replica of the source object, and wherein the first replica and the second replica each represent a same particular point in time copy of the source object, wherein the first replica is associated with the third generation identifier and wherein the second replica is associated with the fourth generation identifier.

13. The method of claim 12, wherein the first snapshot is associated with a first set of one or more data structures representing the same particular point in time copy of the source object and the second snapshot is associated with a second different set of one or more data structures also representing the same particular point in time copy of the source object.

14. A system comprising:
one or more processors; and
one or more memories comprising code stored thereon that, when executed, performs a method of creating and using snapshots comprising:
receiving a request to create a new snapshot of a source object;
determining that a first generation identifier associated with the source object matches a second generation identifier associated with a base snapshot of the source object;
determining that the source object has been modified since the base snapshot was created; and
responsive to determining that the first generation identifier matches the second generation identifier and also determining that the source object has not been modified since the base snapshot was created, associating the new snapshot with the base snapshot thereby indicating that the new snapshot and the base snapshot have matching content and denote a same point in time copy of the source object.

15. A computer-readable medium comprising code stored thereon that, when executed, performs a method of creating and using snapshots comprising:
receiving a request to create a new snapshot of a source object;
determining that a first generation identifier associated with the source object matches a second generation identifier associated with a base snapshot of the source object;
determining that the source object has been modified since the base snapshot was created; and
responsive to determining that the first generation identifier matches the second generation identifier and also determining that the source object has not been modified since the base snapshot was created, associating the new snapshot with the base snapshot thereby indicating that the new snapshot and the base snapshot have matching content and denote a same point in time copy of the source object.

16. A method of creating and using snapshots comprising:
receiving a request to create a new snapshot of a source object;
determining at least one of: that a first generation identifier associated with the source object does not match a second generation identifier associated with a base snapshot of the source object, and that the source object has been modified since the base snapshot was created; and
responsive to determining that the first generation identifier does not match the second generation identifier or determining that the source object has been modified since the base snapshot was created, performing first processing to create a new replica denoting a new snapshot instance of the source object on the data path and associated the new replica with the new snapshot.

17. The method of claim 16, further comprising:
determining that the base snapshot is not specified in the request; and
responsive to determining that the base snapshot is not specified in the request, performing the first processing to create a new replica denoting a new snapshot instance of the source object on the data path and associated the new replica with the new snapshot.

18. A computer-readable medium comprising codes stored thereon that, when executed, performs a method of creating and using snapshots comprising:
receiving a request to create a new snapshot of a source object;
determining at least one of: that a first generation identifier associated with the source object does not match a second generation identifier associated with a base snapshot of the source object, and that the source object has been modified since the base snapshot was created; and
responsive to determining that the first generation identifier does not match the second generation identifier or determining that the source object has been modified since the base snapshot was created, performing first processing to create a new replica denoting a new snapshot instance of the source object on the data path and associated the new replica with the new snapshot.

19. A system comprising:
one or more processors; and
a memory comprising code stored thereon that, when executed, performs a method of creating and using snapshots comprising:
receiving a request to create a new snapshot of a source object;
determining at least one of: that a first generation identifier associated with the source object does not match a second generation identifier associated with a base snapshot of the source object, and that the source object has been modified since the base snapshot was created; and
responsive to determining that the first generation identifier does not match the second generation identifier or determining that the source object has been modified since the base snapshot was created, performing first processing to create a new replica denoting a new snapshot instance of the source object on the data path and associated the new replica with the new snapshot.

* * * * *